United States Patent
Parundekar et al.

(10) Patent No.: US 9,026,364 B2
(45) Date of Patent: May 5, 2015

(54) PLACE AFFINITY ESTIMATION

(75) Inventors: Rahul Ravi Parundekar, Sunnyvale, CA (US); Kentaro Oguchi, Menlo Park, CA (US); Shojiro Takeuchi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 295 days.

(21) Appl. No.: 13/436,570

(22) Filed: Mar. 30, 2012

(65) Prior Publication Data

US 2013/0151148 A1 Jun. 13, 2013

Related U.S. Application Data

(60) Provisional application No. 61/569,460, filed on Dec. 12, 2011.

(51) Int. Cl.
*G01C 21/00* (2006.01)
*G06F 17/30* (2006.01)
*G01C 21/36* (2006.01)

(52) U.S. Cl.
CPC .................. *G01C 21/3679* (2013.01)

(58) Field of Classification Search
CPC .......................... H04L 43/0876; H04L 12/26
USPC ......... 701/426, 427, 469, 521, 532, 533, 213; 342/357.31; 340/466, 936, 990, 995.19
See application file for complete search history.

(56) References Cited

U.S. PATENT DOCUMENTS

| | | | |
|---|---|---|---|
| 6,212,473 B1 * | 4/2001 | Stefan et al. | 701/427 |
| 6,542,812 B1 * | 4/2003 | Obradovich et al. | 701/426 |
| 7,286,931 B2 * | 10/2007 | Kawasaki | 701/426 |
| 7,765,178 B1 * | 7/2010 | Roizen et al. | 1/1 |
| 8,520,002 B2 * | 8/2013 | Stambaugh | 345/441 |
| 2004/0066330 A1 * | 4/2004 | Knockeart et al. | 342/357.07 |
| 2004/0104842 A1 * | 6/2004 | Drury et al. | 342/357.13 |
| 2007/0100805 A1 * | 5/2007 | Ramer et al. | 707/3 |
| 2010/0211304 A1 * | 8/2010 | Hwang et al. | 701/200 |
| 2010/0302056 A1 * | 12/2010 | Dutton et al. | 340/825.49 |
| 2010/0305855 A1 * | 12/2010 | Dutton et al. | 701/213 |
| 2010/0331016 A1 * | 12/2010 | Dutton et al. | 455/456.3 |
| 2013/0151148 A1 * | 6/2013 | Parundekar et al. | 701/521 |

OTHER PUBLICATIONS

Ambite et al., "Automatically Constructing Semantic Web Services from Online Sources." The Semantic Web-ISWC 2009, pp. 17-32.

Berners-Lee, "Design Issues: Linked Data." Online at http://www.w3.org/DesignIssues/LinkedData.html (2006).

Bicer et al., "Relational Kernel Machines for Learning from Graph-Structured RDF Data." The Semantic Web: Research and Applications pp. 47-62 (2011).

(Continued)

*Primary Examiner* — Thomas G Black
*Assistant Examiner* — Wae Louie
(74) *Attorney, Agent, or Firm* — Patent Law Works LLP

(57) ABSTRACT

A system and method for estimating a place affinity for a user is disclosed. The system comprises a gathering module, a communication module and a scoring module. The gathering module receives a place and retrieves rich place data associated with the place. The communication module retrieves user profile data associated with a user and a place affinity model associated with the user. The scoring module estimates an affinity score for the place using the place affinity model based at least in part on the rich place data and the user profile data.

31 Claims, 22 Drawing Sheets

(56) References Cited

OTHER PUBLICATIONS

Crockford, "The Application/json Media Type for Javascript Object Notation (json)." Online at https://tools.ietf.org/html/rfc4627 (2006).
Ding et al., "Tracking RDF Graph Provenance Using RDF Molecules." In: Proc. of the 4th International Semantic Web Conference (Poster) (2005).
Hollenbach et al., "Using RDF Metadata to Enable Access Control on the Social Semantic Web." In: Workshop on Collaborative Construction, Management and Linking of Structured Knowledge (2009).
Kopecký et al., "Semantic Annotations for WSDL and XML Schema." IEEE Internet Computing pp. 60-67 (2007).
Lin et al., "Learning Relational Bayesian Classifiers from RDF Data." The Semantic Web-ISWC 2011 pp. 389-404.
McBride, "Jena: A Semantic Web Toolkit." Internet Computing, IEEE 6(6), pp. 55-59 (2002).
McIlraith et al., "Semantic Web Services." Intelligent Systems, IEEE 16(2), pp. 46-53 (2001).
Passant, "dbrecmusic Recommendations Using DBpedia." The Semantic Web-ISWC 2010 pp. 209-224 (2010).
Pazzani et al., "Learning and Revising User Profiles: The Identification of Interesting Web Sites." Machine Learning 27 (3), pp. 313-331 (1997).
Pazzani et al. "Content-Based Recommendation Systems." The Adaptive Web, pp. 325-341 (2007).
Wagner et al., "Linked Data for a Privacy-Aware Smart Grid." in: INFORMATIK 2010 Workshop—Informatik für die Energiesysteme der Zukunft (2010).

\* cited by examiner

PLACE AFFINITY ESTIMATION

CROSS REFERENCE TO RELATED APPLICATIONS

This application claims priority under 35 USC §119(e) to U.S. Application No. 61/569,460, entitled "Place Affinity Estimation" filed Dec. 12, 2011, the entirety of which is herein incorporated by reference.

BACKGROUND

The specification relates to data processing systems. In particular, the specification relates to a system and method for estimating a place affinity for a user.

It is helpful to learn a user's preference or affinity to different places (e.g., places that the user likes or dislikes, etc.) so that a navigation system may provide personalized navigation services to the user. Existing systems in a vehicle that model a place affinity (or, place preference) for a user require an explicit input of the preference from the user. For example, a user may add a place to a list of "Favorites" or give an explicit feedback describing that he or she likes or dislikes a place. However, this manual mode of entering a liked place in existing systems has been proven to be deficient and problematic in eliciting the place preference from the user since the user usually ignores the request and does not provide any input.

SUMMARY OF THE INVENTION

The specification overcomes the deficiencies and limitations of the prior art at least in part by providing a system and method for estimating a place affinity for a user. The system comprises a gathering module, a communication module and a scoring module. The gathering module receives a place and retrieves rich place data associated with the place. The communication module retrieves user profile data associated with a user and a place affinity model associated with the user. The scoring module estimates an affinity score for the place using the place affinity model based at least in part on the rich place data and the user profile data.

The specification also provides a system and method for generating a place affinity model associated with a user. The system comprises a communication module, gathering module and a modeling module. The communication module receives a place associated with a user and retrieves user profile data for the user. The gathering module retrieves rich place data associated with the place. The modeling module retrieves a previous state of the place affinity model associated with the user and generates the place affinity model associated with the user based at least in part on the rich place data and the previous state of the place affinity model.

The specification provides another method for generating a place affinity model associated with a user. The method comprises receiving a place associated with a user, retrieving rich place data associated with the place, retrieving user profile data for the user, retrieving a default standard-user place affinity model pre-computed for one or more groups of users and generating a place affinity model associate with the user based at least in part on the rich place data and the default standard-user place affinity model.

The specification provides yet another method for generating a place affinity model associated with a user. The method comprises receiving a place associated with a user, retrieving rich place data associated with the place, retrieving user profile data for the user, retrieving an average-user place affinity model generated by aggregating individual place affinity models for a group of users and generating a place affinity model associate with the user based at least in part on the rich place data and the average-user place affinity model.

Furthermore, the specification provides a system and method for personalizing a place search result for a user. The system comprises a communication module, a personalization module and a scoring module. The communication module receives a search request from a user. The personalization module determines one or more matching places matched to the search request. The scoring module estimates one or more affinity scores for the one or more matching places. The personalization module then personalizes the one or more matching places based at least in part on one or more affinity scores.

The specification provides a system and method for estimating a currently visited place for a user. The system comprises a communication module and a place estimation module. The communication module receives sensor data for a vehicle associated with a user. The sensor data describes a current vehicle location. The communication module retrieves candidate place data describing one or more candidate places within a range of the current vehicle location. The communication module also retrieves historical place data describing one or more places visited by the user in the past. The place estimation module estimates a currently visited place for the user based at least in part on the one or more of the current vehicle location, the candidate place data and the historical place data.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
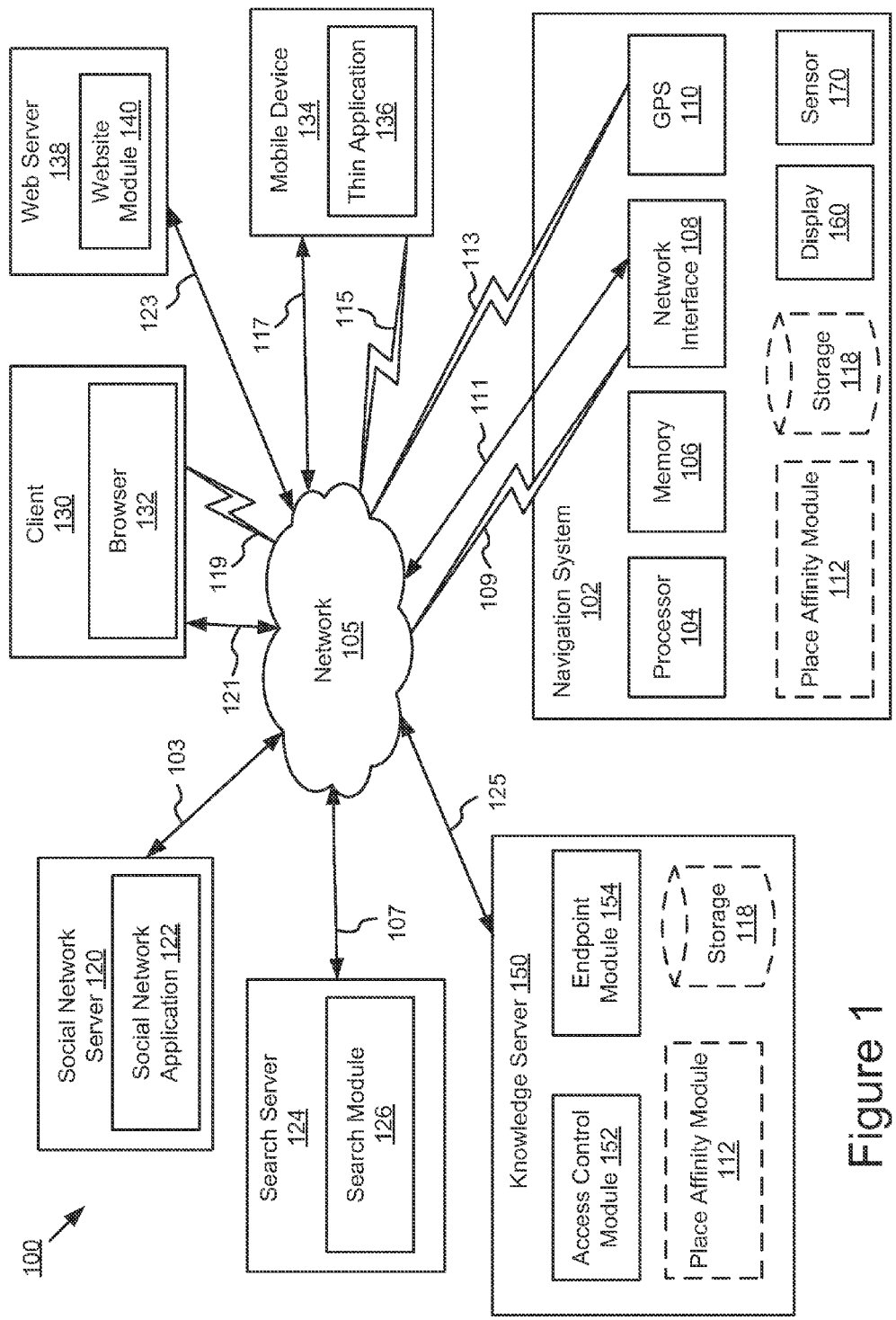
FIG. 1 is a high-level block diagram illustrating a system for estimating a place affinity for a user according to one embodiment.

A system and method for estimating a place affinity for a user is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for estimating a place affinity for a user according to one embodiment. The illustrated system 100 includes a navigation system 102, a social network server 120, a search server 124, a client device 130, a mobile device 134, a web server 138 and a knowledge server 150. These entities of the system 100 are communicatively coupled to each other to facilitate transmitting and receiving of information (e.g., a place search request, data associated with a place, etc.) between each other. In the illustrated embodiment, these entities are communicatively coupled via a network 105.

Although FIG. 1 illustrates one navigation system 102, one social network server 120, one search server 124, one client device 130, one mobile device 134, one web server 138 and one knowledge server 150, persons skilled in the art will appreciate that the description applies to any system architecture having any number of navigation systems 102, social network servers 120, search servers 124, client devices 130, mobile devices 134, web servers 138 and knowledge servers 150. Furthermore, although only one network 105 is coupled to the navigation system 102, the social network server 120, the search server 124, the client device 130, the mobile device 134, the web server 138 and the knowledge server 150, in practice any number of networks 105 can be connected to the entities.

In the illustrated embodiment, the social network server 120 is communicatively coupled to the network 105 via signal line 103. The search server 124 is communicatively coupled to the network 105 via signal line 107. The client 130 is communicatively coupled to the network 105 via one or more of signal lines 119 and 121. The mobile device 134 is communicatively coupled to the network 105 via one or more of signal lines 115 and 117. The web server 138 is communicatively coupled to the network 105 via signal line 123. The knowledge server 150 is communicatively coupled to the network 105 via signal line 125. The navigation system 102 is communicatively coupled to the network 105 via one or more of signal lines 109, 111 and 113. In one embodiment, a network interface 108 comprised within the navigation system 102 is communicatively coupled to the network 105 via one or more of signal lines 109 and 111. A global positioning system (GPS) 110 comprised within the navigation system 102 is communicatively coupled to the network 105 via signal line 113. In one embodiment, each of signal lines 103, 107, 111, 117, 121, 123 and 125 represents one of a wired connection (e.g., a connection via a cable) and a wireless connection (e.g., a wireless local area network (LAN) connection). Each of signal lines 109, 113, 115 and 119 represents a wireless connection (e.g., a wireless LAN connection, a satellite connection, etc.).

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth® communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The navigation system 102 is a system for providing navigation information. For example, the navigation system 102 is an on-board navigation system embedded in a vehicle. The navigation system 102 includes a processor 104, a memory 106, a network interface 108, a GPS 110, a place affinity module 112, a storage device 118, a sensor 170 and a display 160. The place affinity module 112 and the storage 118 are depicted using dashed lines to indicate that in one embodiment the place affinity module 112 and the storage 118 are comprised within the knowledge server 150.

Although only one processor 104, one memory 106, one network interface 108, one GPS 110, one storage 118, one sensor 170 and one display 160 are illustrated in the navigation system 102, one skilled in the art will recognize that any number of these components are available in the navigation system 102. One skilled in the art will also appreciate that the navigation system 102 may include any other components not shown in FIG. 1 such as an input device, an audio system and other components conventional to a navigation system.

The processor 104 comprises an arithmetic logic unit, a microprocessor, a general purpose controller or some other processor array to perform computations, retrieve data stored on the storage 118, etc. The processor 104 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 106 stores instructions and/or data that may be executed by the processor 104. The instructions and/or data may comprise code for performing any and/or all of the techniques described herein. The memory 106 may be a dynamic random access memory (DRAM) device, a static random access memory (SRAM) device, flash memory or some other memory device known in the art. In one embodiment, the memory 106 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The network interface 108 is an interface for connecting the navigation system 102 to a network. For example, the network interface 108 is a network adapter that connects the navigation system 102 to the network 105. The network interface 108 is communicatively coupled to the network 105 via one or more of signal lines 111 and 109. In one embodiment, the network interface 108 receives data from one or more of the social network server 120, the search server 124, the client 130, the mobile device 134, the web server 138 and the knowledge server 150 via the network 105. The network interface 108 sends the received data to one or more components of the navigation system 102 (e.g., the place affinity module 112, etc.). In another embodiment, the network interface 108 receives data from one or more components of the navigation system 102 (e.g., the place affinity module 112, etc.) and sends the data to one or more of the social network server 120, the search server 124, the client 130, the mobile device 134, the web server 138 and the knowledge server 150 via the network 105.

In one embodiment, the network interface 108 includes a port for direct physical connection to the network 105 or to another communication channel. For example, the network interface 108 includes a universal serial bus (USB), a category 5 (CAT-5) cable or similar port for wired communication with the network 105. In another embodiment, the network interface 108 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the network interface 108 includes a NFC chip that generates a radio frequency (RF) for short-range communication.

The GPS 110 is a system for providing location data and timestamp data. For example, the GPS 110 is a conventional GPS that locates a vehicle in real time and provides timestamp data describing the current time. In one embodiment, the GPS 110 sends the location data and the timestamp data to the place affinity module 112. One skilled in the art will recognize that the GPS 110 may provide driving information (e.g., driving instructions to a destination, estimated time of arrival, etc.) and other information such as information about gas stations, restaurants, hotels, etc., to a user.

The place affinity module 112 is code and routines for modeling and estimating a place affinity for a user. In one embodiment, the place affinity module 112 includes code and routines stored in an on-chip storage (not pictured) of the processor 104. In another embodiment, the place affinity module 112 is implemented using hardware such as a field-programmable gate array (FPGA) or an application-specific integrated circuit (ASIC). In yet another embodiment, the place affinity module 112 is implemented using a combination of hardware and software.

The place affinity for a user is data describing the user's preference for one or more places. For example, the place affinity for a user includes data describing one or more characteristics for one or more places that the user likes. For example, a user prefers places with certain brands, such as Toyota, X Coffee, etc. The place affinity is also referred to as a place preference hereinafter. The place affinity module 112 is described below in more detail with reference to FIGS. 2-18.

The storage device 118 is a non-transitory memory that stores data. For example, the storage device 118 is a dynamic random access memory (DRAM) device, a static random access memory (SRAM) device, flash memory or some other memory device known in the art. In one embodiment, the storage device 118 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the storage 118 stores identification data for authenticating one or more users, historical place data describing one or more places that a user has visited (also referred to as one or more points of interest (POIs) that the user has visited), liked place data describing one or more places that a user likes, a geospatial place look-up table, model data describing one more place affinity models for a user, affinity score data describing one or more affinity scores for one or more places, rich place data for one or more places and user profile data describing a user's interests, hobbies, etc. One skilled in the art will recognize that the storage 118 may store any other data for providing the functionality described herein.

In one embodiment, the storage 118 incorporates an ontology defining a concept hierarchy of places based on their categories and the properties associated with each of those place types. All concepts and properties in the ontology belong to the ontology namespace. In one embodiment, the data stored in the storage 118 is identified by Uniform Resource Identifiers (URIs) and represented in Resource Description Framework (RDF). For example, the rich place data is retrieved from multiple sources and incorporated into the ontology in the storage 118. In another embodiment, the storage 118 provides more sophisticated data structures including one or more of lists, stacks and queues. For example, the storage 118 provides a sorted list of places to a requesting component of the system 100 such as the navigation system 102. The storage 118 will be described in further detail below with reference to FIGS. 3A-3B.

The display 160 is any device for displaying data to a user. For example, the display 160 is one of a touch screen display device, a liquid crystal display (LCD) and any other conventional display device known to one skilled in the art.

The sensor 170 is any type of conventional sensor configured to collect any type of data for a traveling vehicle. For example, the sensor 170 is one of the following: a light detection and ranging (LIDAR) sensor; an infrared detector; a motion detector; a thermostat; and a sound detector, etc. Persons having ordinary skill in the art will recognize that other types of sensors are possible.

In one embodiment, the system 100 includes a combination of different types of sensors 170. For example, the system 100 includes a first sensor 170 for determining a current time and a second sensor 170 for locating a vehicle in real time. In another embodiment, the system 100 includes a sensor 170 for estimating a time spent at a place. For example, the sensor 170 determines a first timestamp that a user leaves a vehicle and a second timestamp that a user returns to the vehicle. The sensor 170 determines the time spent at the place based at least in part on the time difference between the first timestamp and the second timestamp.

The social network server 120 is any computing device having a processor (not pictured) and a computer-readable storage medium (not pictured) storing data for providing a social network to users. Although only one social network server 120 is shown, persons of ordinary skill in the art will recognize that multiple social network servers 120 may be present. A social network is any type of social structure where the users are connected by a common feature. The common feature includes friendship, family, work, an interest, etc. The common features are provided by one or more social networking systems, such as those included in the system 100, including explicitly-defined relationships and relationships implied by social connections with other users, where the relationships are defined in a social graph. The social graph is a mapping of all users in a social network and how they are related to each other.

For clarity and convenience, hereinafter, the social connection of a user is also referred to as another user connected to the user by one or more of the common features.

In the depicted embodiment, the social network server 120 includes a social network application 122. The social network application 122 includes code and routines stored on a memory (not pictured) of the social network server 120 that, when executed by a processor (not pictured) of the social network server 120, causes the social network server 120 to provide a social network accessible by a client device 130 and/or a mobile device 134 via the network 105. In one embodiment, a user publishes comments on the social network. For example, a user of the social network application 122 provides a status update and other users make comments on the status update. In another embodiment, a user in a vehicle interacts with the social network via a social feature added to the navigation system 102. For example, a user clicks on a social graphic such as a "share" button shown on a graphical user interface ("GUI", "GUIs") presented by a display 160 of the navigation system 102 to share a liked place in the social network.

The search server 124 is any computing device having a processor (not pictured) and a computer-readable storage medium (not pictured) storing data for providing a search service to users. In the depicted embodiment, the search server 124 includes a search module 126. The search module 126 is code and routines for providing one or more search results to a user. In one embodiment, the search module 126 receives a search request from a user operating on the navigation system 102 via the network 105, searches a plurality of data sources (e.g., a data source included in the search server 124, a data source from the social network server 120, etc.) for one or more results matching to the search request and sends the results to the navigation system 102.

For example, the search module 126 receives an input to search for a bank near a current location of a user operating on the navigation system 102. The search module 126 searches a plurality of data sources for matching banks and sends the banks to the navigation system 102 via the network 105, causing the display 160 to present the matching banks to the user. In one embodiment, the place affinity module 112 personalizes the results for the user before presenting the results to the user as described below with reference to FIG. 14. GUIs for presenting search results to a user will be described below with reference to FIG. 18.

The client 130 is any computing device that includes a memory (not pictured) and a processor (not pictured). For example, the client 130 is a personal computer ("PC"), a cell phone (e.g., a smart phone, a feature phone, etc.), a tablet computer (or tablet PC), a laptop, etc. One having ordinary skill in the art will recognize that other types of clients 130 are possible. In one embodiment, the system 100 comprises a combination of different types of clients 130.

In the illustrated embodiment, the client 130 comprises a browser 132. In one embodiment, the browser 132 is code and routines stored in a memory of the client 130 and executed by a processor of the client 130. For example, the browser 130 is a browser application such as Mozilla Firefox. In one embodiment, the browser 130 presents a GUI to a user on a display device (not pictured) of the client 130 and allows the user to input information via the GUI.

The mobile device 134 is any mobile computing device that includes a memory (not pictured) and a processor (not pictured). For example, the mobile device 134 is a cell phone (e.g., a smart phone, a feature phone, etc.), a tablet computer (or tablet PC), a laptop, etc. One having ordinary skill in the art will recognize that other types of mobile devices 134 are possible. In one embodiment, the system 100 comprises a combination of different types of mobile devices 134.

In the illustrated embodiment, the mobile device 134 comprises a thin application 136. In one embodiment, the thin application 136 is code and routines stored in a memory of the mobile device 134 and executed by a processor of the mobile device 134. For example, the thin application 136 is an application that provides a GUI for a user to interact with the navigation system 102.

The web server 138 is a hardware server device. The web server 138 comprises a website module 140. The website module 140 is code and routines that, when executed by a processor (not pictured), generates a website (not pictured) that is hosted by the web server 138. For example, the web server 138 hosts a website generated by the website module 140, and the website is accessed by one or more of the navigation system 102, the mobile device 134 and the browser 132 operating on the client device 130 via the network 105. In one embodiment, the website module 140 is stored on a non-transitory memory (not pictured) associated with the web server 138.

The knowledge server 150 is any computing device having a processor (not pictured) and a computer-readable storage medium storing data for learning a place affinity for a user. For example, the knowledge server 150 is a semantic web knowledge system for providing the functionality described herein (also referred to as an "IKCoN" system described below). In the depicted embodiment, the knowledge server 150 includes an access control module 152 and an endpoint module 154. In one embodiment, the knowledge server 150 also includes a place affinity module 112 and a storage 118. These components of the knowledge server 150 are communicatively coupled to each other.

The access control module 152 is code and routines for controlling access to the knowledge server 150. For example, the access control module 152 is an access control application programming interface (API). In one embodiment, the access control module 152 authenticates a user or a navigation system 102 embedded in a vehicle before authorizing the user or the navigation system 102 to access any data in the knowledge server 150. For example, the access control module 152 authenticates a user or a navigation system 102 based on an identifier and a secret passkey or a combination of both.

In one embodiment, the access control module 152 controls access to the knowledge server 150 based at least in part on namespaces. For example, the access control module 152 controls access to the knowledge server 150 based on one or more of an ontology namespace, an instance namespace, a namespace for each user, a namespace for each platform service and a subspace for each platform service within a user's namespace, etc. In one embodiment, the access control module 152 establishes different access control rules for the different namespaces. For example, all user specific data (e.g., the user's home or work address, etc.) not owned by any components in the system 100 belongs to the user's namespace. The access control module 152 grants an access to any component in the system 100 such as the client 130 as long as the component provides identification data for the user matching the user authentication data.

The endpoint module 154 is code and routines for providing an interface through which an application interacts with the place affinity module 112 and the storage 118. For example, the endpoint module 154 is an endpoint conforming to representational state transfer (REST) constraints such as a RESTful endpoint for providing one or more RESTful services. In one embodiment, the endpoint module 154 determines whether to provide the services synchronously or asynchronously. For example, the endpoint module 154 determines that an application executed in the client 130 proceeds accessing the knowledge server 150 while the place affinity module 112 updates the place affinity model.

Place Affinity Module 112

Figure 2:
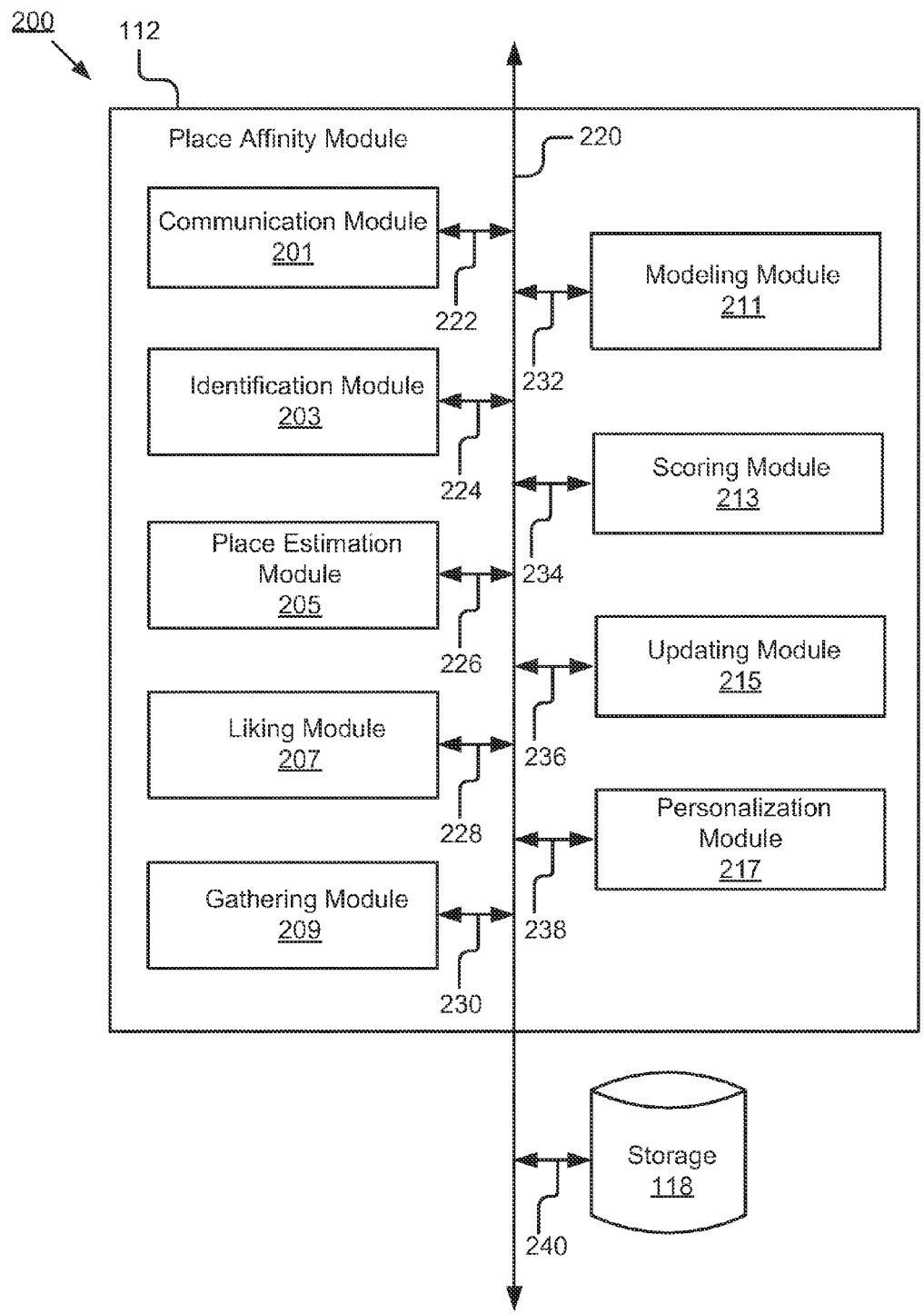
FIG. 2 is a block diagram illustrating a place affinity module in detail according to one embodiment.

Referring now to FIG. 2, depicted is a block diagram of a computing system 200 including a place affinity module 112 in more detail according to one embodiment. In one embodiment, the computing system 200 is the navigation system 102. In another embodiment, the computing system 200 is the knowledge server 150. In the illustrated embodiment, the place affinity module 112 includes a communication module 201, an identification module 203, a place estimation module 205, a liking module 207, a gathering module 209, a modeling module 211, a scoring module 213, an updating module 215 and a personalization module 217. In one embodiment, these components of the place affinity module 112 are communicatively coupled to each other via a bus 220. The computing system 200 also includes storage 118.

In the illustrated embodiment, the communication module 201 is communicatively coupled to the bus 220 via signal line 222. The identification module 203 is communicatively coupled to the bus 220 via signal line 224. The place estimation module 205 is communicatively coupled to the bus 220 via signal line 226. The liking module 207 is communicatively coupled to the bus 220 via signal line 228. The gathering module 209 is communicatively coupled to the bus 220 via signal line 230. The modeling module 211 is communicatively coupled to the bus 220 via signal line 232. The scoring module 213 is communicatively coupled to the bus 220 via signal line 234. The updating module 215 is communicatively coupled to the bus 220 via signal line 236. The personalization module 217 is communicatively coupled to the bus 220 via signal line 238. The storage 118 is communicatively coupled to the bus 220 via signal line 240.

The communication module 201 is code and routines for handling communications between components of the place affinity module 112 and other components of the system 100. For example, the communication module 201 receives location data and timestamp data from one or more of the GPS 110 and the sensor 170 and sends the location data and the timestamp data to one or more of the place estimation module 205, the modeling module 211 and the scoring module 213. In one embodiment, the communication module 201 also handles communications among components of the place affinity module 112. For example, the communication module 201 receives place data describing an estimate of a currently visited place from the place estimation module 205 and sends the place data to the liking module 207.

The identification module 203 is code and routines for identifying a user. In one embodiment, a sensor 170 reads identification data for a user and sends the identification data to the identification module 203. For example, the sensor 170 reads the identification data via a card wiping or a radio-frequency identification (RFID) card. In another embodiment, a user inputs the identification data via a graphical user interface (GUI) generated by the navigation system 102. The identification module 203 compares the received identification data to user authentication data stored in the storage 118 and verifies the identity of the user. If the identification data matches to the user authentication data for the user, the identification module sends the identification data associated with the user to other components of the place affinity module 112 such as the place estimation module 205, the gathering module 209, etc.

In one embodiment, the identification data is one of a user name and a password, a proxy device for a user such as a card or a handheld device and/or a vehicle that the user is registered to, etc. One skilled in the art will recognize that other forms for the identification data are possible.

The place estimation module 205 is code and routines for estimating a currently visited place for a user. The place estimation module 205 receives sensor data such as GPS location data describing a current vehicle location and timestamp data describing the time of the day from one or more of the GPS 110 and the sensor 170. In one embodiment, the place estimation module 205 estimates a currently visited place for a user when the vehicle is stationary at the location. The place estimation module 205 retrieves candidate place data describing one or more candidate places close to the vehicle location (e.g., within a predetermined range (e.g., 100 meters) of the location) from a geospatial look-up table stored in the storage 118. The place estimation module 205 retrieves historical place data describing one or more places visited by the user in the past that are close to the vehicle location (e.g., within a predetermined range (e.g., 100 meters) of the location) based at least in part on the identification data for the user.

In one embodiment, the place estimation module 205 estimates a currently visited place based at least in part on one or more of the vehicle location, the time, the identification data, the historical place data and the candidate place data. In one embodiment, the place estimation module 205 selects a place as the currently visited place from the historically visited places by the user. For example, from the one or more candidate places, the place estimation module 205 selects a place that has been visited by the user. In another embodiment, the place estimation module 205 chooses a place as the currently visited place based on the time spent on it and the time of the day. For example, the place estimation module 205 determines a restaurant from the one or more candidate places as the currently visited place based on that it is the noon and the user spent one and a half hour at the place. In yet another embodiment, the place estimation module 205 determines a candidate place within a walkable distance to the vehicle location as the currently visited place.

The place estimation module 205 stores place data describing the currently visited place in the storage 118 as a part of the historical place data for the user.

The liking module 207 is code and routines for determining like data indicating if a user likes a place. The liking module 207 receives place data describing a currently visited place from the place estimation module 205 and identification data from the identification module 203. In one embodiment, the liking module 207 receives new visited place data describing a newly visited place from the place estimation module 205. The liking module 207 receives sensor data describing the time spent at the place for the current visit to the place from a sensor 170. The liking module 207 retrieves a visiting frequency to the place and the past time spent at the place for each past visit to the place from the historical place data stored in the storage 118.

In one embodiment, the liking module 207 determines like data for the place based at least in part on one or more of the identification data, the place data, the time spent for the current visit, the visiting frequency and the time spent for each past visit. In one embodiment, the like data describes that the user likes the place and the place is referred to as a liked place (or, a preferred place). The liking module 207 stores the liked place data describing the liked place in the storage 118. Alternatively, the like data describes that the user does not like the place and the place is referred to as a not-liked place (or, a not-preferred place). In one embodiment, the like module stores the like data for the place in the storage 118.

The gathering module 209 is code and routines for collecting data for a place. The gathering module 209 receives the identification data from the identification module 203 and place data describing a liked place from the liking module 207. The gathering module 209 collects a variety of data associated with the liked place for a user from a plurality of data sources. In one embodiment, the gathering module 209 retrieves data associated with the liked place from the historical place data stored in the storage 118.

In one embodiment, the gathering module 209 additionally collects data for the liked place from one or more of the search server 124, the web server 138, the mobile device 134, the client 130 and the social network server 120, etc. For example, the gathering module 209 collects data describing that friends of the user on a social network have visited the place. As another example, the gathering module 209 collects data describing one or more reviews for the place from a web server 138. One skilled in the art will recognize that the gathering module 209 may collect any other data for the liked place from any data sources. The data collected from a plurality of data sources for a place is referred to as rich place data.

In another embodiment, the gathering module 209 receives place data describing a place (e.g., a liked place or a not-liked place) from the place estimation module 205 and collects rich place data for the place as described above. In either embodiment, the gathering module 209 stores the rich place data in the storage 118. In one embodiment, the gathering module 209 also sends the rich place data to the modeling module 211 and/or updating module 215.

In one embodiment, the place is marked with an affinity value by the user based on inputs from different sources. For example, the user marks a place with an affinity value based on inputs from an interactive dialog, a survey, retrieved personal data from social networks, etc. The affinity value for the place indicates how the user likes the place. The gathering module 209 receives the affinity value for the place marked by the user and includes the affinity value for the place in the rich place data and stores it in the storage 118. In one embodiment, the affinity value for the place marked by the user is used to generate a place affinity model for the user.

The modeling module 211 is code and routines for generating a place affinity model for a user. In one embodiment, the modeling module 211 receives identification data from the identification module 203 and rich place data from the gathering module 209. In another embodiment, the modeling module 211 receives place data describing places from one or more of other components in the system 100 via the communication module 201. For example, when a driver searches POIs on a desktop at home and sends the POIs from the desktop to the in-vehicle navigation system 102 via the network 105 before getting into the car, the modeling module 211 receives the POIs via the communication module 201 and the network 105. As another example, a driver selects a place from a smart phone using an installed application and sends the place to the vehicle as a destination for the navigation system 102. The modeling module 211 receives place data describing the place via the communication module 201 and the network 105. In yet another example, the modeling module 211 retrieves places that a user has visited from the historical place data in the storage 118. The modeling module 211 then instructs the gathering module 209 to retrieve rich place data for the places and builds a place affinity model for the user as described below.

The modeling module 211 retrieves user profile data (e.g., user's address, interests, hobbies, etc.) from the storage 118 for adding context to the rich place data. For example, the ontology for representations of data helps an automatic extrapolation of context. The modeling module 211 adds the user profile data as context to the rich place data based on certain rules programmed in the modeling module 211. For example, if the user profile data includes the user's home or work address, the modeling module 211 adds a distance from home or a distance from work context to the rich place data.

The modeling module 211 also retrieves sensor data from one or more sensors 170 and determines situation data describing a situation for a user based on the sensor data. For example, the modeling module 211 retrieves timestamp data describing that the time is noon and location data describing that the vehicle has parked on a plaza from a sensor 170. The modeling module 211 estimates a situation that the user is out for lunch based on the timestamp data and the location data. In one embodiment, the modeling module 211 adds the situation to the rich place data as context. For example, the modeling module 211 determines whether a driver accessed an Automated Teller Machine (ATM) of a bank or actually had to stop by the bank for a longer time based on whether the time of the day was in the morning or evening and that the time spent at the bank. The modeling module 211 adds the situation such as that the driver accessed the ATM only to the context of the rich place data for the bank.

The modeling module 211 uses the rich place data and the context to generate a place affinity model. In one embodiment, the modeling module 211 generates a place affinity model for the user based at least in part on the user profile data, the rich place data, the situation data and the sensor data describing the time and the location, etc. In one embodiment, a place affinity model is a model characterizing a place preference for a user. Accordingly, the place affinity model is also referred to as a preference model. For example, the place affinity model includes model data describing all the favorite places for the user and the common characteristics for the favorite places.

In one embodiment, the modeling module 211 retrieves a previous state of the place affinity model for the user from the model data described below with reference to FIG. 3A. In one embodiment, the modeling module 211 generates a place affinity model associated with the user based at least in part on the rich place data and the previous state of the place affinity model as described below with reference to FIG. 3A.

In one embodiment, the modeling module 211 pre-computes a default standard-user place affinity model for one or more groups of users. For example, the modeling module 211 pre-computes the default standard-user place affinity model based at least in part on empirical evidence such as experiences and observations. The modeling module 211 stores the default standard-user place affinity model in the storage 118 as model data. In one embodiment, a standard-user place affinity model is a pre-computed and/or pre-configured place affinity model for a standard user. For example, a standard user is a user having general preferences as a human-being, e.g., preferring places that are nearer than farther. In one embodiment, the modeling module 211 uses the standard-user place affinity model as a seed place affinity model by customizing the standard-user place affinity model to an individual place affinity model for a user. For example, the modeling module 211 retrieves the default standard-user place affinity model from model data in the storage 118 and generates a place affinity model associated with a user based at least in part on the rich place data and the default standard-user place affinity model.

In one embodiment, the modeling module 211 generates an average-user place affinity model and publishes the average-user place affinity model periodically. For example, the modeling module 211 comprised in the knowledge server 150 retrieves one or more individual place affinity models (e.g., user preference models) for a group of users from the model data described below with reference to FIG. 3A and builds an average-user place affinity model by aggregating the one or more individual place affinity models for the group of users. In one embodiment, the modeling module 211 generates average-user place affinity models for multiple groups of users. For example, people in the bay area prefer smaller distance while people in the Midwest can accept larger distance. The modeling module 211 builds an average-user place affinity models for each of these two groups of people by aggregating individual place affinity models for users in each group.

In one embodiment, the modeling module 211 publishes the average-user place affinity model to components of the system 100 periodically. For example, the modeling module 211 comprised in the knowledge server 150 periodically retrieves individual place affinity models from other components of the system 100 (such as navigation systems for other users) and periodically feeds an average-user place affinity model back to the components of the system 100. In one embodiment, the modeling module 211 retrieves an average-user place affinity model from the model data described below with reference to FIG. 3A and generates a place affinity model associated with the user based at least in part on the rich place data and the average-user place affinity model.

In one embodiment, the modeling module 211 applies machine learning techniques to generate the place affinity model for the user. The modeling module 211 converts the data (e.g., data represented in RDF) used to generate the place affinity model into a suitable representation (e.g., machine learnable data). Different sources have different representations for the data such as rich place data. The modeling module 211 converts the data from different sources into machine learnable data. The machine learnable data will be described in further detail below with reference to FIG. 16. The modeling module 211 then applies machine learning methods to the data and generates the place affinity model for the user. In one embodiment, the modeling module 211 stores model data describing the place affinity model for the user in the storage 118.

The scoring module 213 is code and routines for estimating an affinity score for a place. In one embodiment, the scoring module 213 receives place data describing a place from one of a user, the place estimation module 205 and any other components of the system 100. In one embodiment, the place is a place that the user has visited. In another embodiment, the place is a place that the user has not visited before. The scoring module 213 receives rich place data for the place from the gathering module 209. In one embodiment, the scoring module 213 also receives user profile data, situation data and sensor data from one or more of the storage 118 and other components of the system 100. The scoring module 213 adds the user profile data and situation data to the rich place data as context. The scoring module 213 retrieves a place affinity model for the user from the storage 118 and estimates an affinity score for the place using the place affinity model based at least in part on the rich place data, the user profile data, the situation data and sensor data describing the time and the location, etc. In one embodiment, the scoring module 213 stores the affinity score in the storage 118.

In another embodiment, the scoring module 213 receives data describing a matching place from the personalization module 217 as described below with reference to personalization module 217 and estimates an affinity score for the matching place. A matching place is a place matching to a search request from a user. The scoring module 213 sends the affinity score for the matching place to the personalized module 217.

The scoring module 213 estimates an affinity score for a place as described below. In one embodiment, the scoring module 213 converts the received data describing a place to machine learnable data and applies a score function to estimate an affinity score for the place. For example, the scoring module 213 uses a score function that computes the Euclidean distance, in a way similar to the nearest neighbor calculation in unsupervised classification algorithms. In one embodiment, the score function is based on a distance-from-unity metric as described below.

For a place to be scored, the scoring module 213 projects the likelihood probabilities for the values of its attributes (or properties) on orthogonal axes. In one embodiment, the place's attributes (or properties) are represented as values as depicted in the machine learnable table 1600. For a value of a property, the scoring module 213 calculates the likelihood probability as P ('value'|preferred) based on the frequency count table of that column. On each axis, the likelihood probability is projected as a continuous numeric function with a maximum possible score of 1.0 for a value that is always preferred, and a minimum score of 0.0 for a value that is absent from the table 1600. The scoring module 213 projects the place as a point in the multi-dimensional space. The scoring module 213 assumes that a place always preferred by the user will have its likelihood value 1.0 on all axes. The point representing the place has the co-ordinates (1.0, 1.0, 1.0, 1.0, 1.0 . . . ) in the multi-dimensional space. The scoring module 213 defines this point as "Unity" and calculates a Euclidean distance between a projected point for a place to be scored and the "Unity" point. In one embodiment, the scoring module 213 uses the Euclidean distance as the affinity score for the place and a place with a minimum distance to the "Unity" is the most preferred place for the user.

The properties of the place are represented as values including numeric values, string values and nominal values, as depicted in the machine learnable table 1600. The scoring module 213 calculates probabilities for numeric values using a Gaussian distribution. In one embodiment, the scoring module 213 also normalizes the probability density function by dividing it by the probability density of the mean. This scales the distance to a range between zero and one. The scoring module 213 calculates probabilities for the string values as similar to a Naïve-Bayes probability based document similarity metric. The scoring module 213 calculates probabilities for the nominal values as the probabilities of the symbol occurring in the column of the table.

In one embodiment, the scoring module 213 explodes the attribute (or property) into its own hyperspace and calculates the distance of the inner objects to the "Unity" point in the hyperspace. The scoring module 213 then normalizes the distance to a value between zero and one by dividing it by the distance from origin to the unity point in the hyperspace. The scoring module 213 collapses the hyperspace for the attribute back to a single axis and the normalized distance becomes a distance from the "Unity" point on the single axis in the original multi-dimensional space. For a multivalued property, the scoring module 213 takes the average of the distances of all its values.

The following is an example of scoring an affinity for a place based on the method discussed above according to one embodiment. Taking advantage of the data describing banks depicted in the table 1600, the scoring module 213 calculates an affinity score (or a distance) for the ABC Bank. The calculation is shown as follows:

$$D(BofABC\_94096) = \sqrt{\begin{array}{l}(1 - P(ABC\text{ Bank}|\text{preferred}))^2 + \\ (1 - P(2353|\text{preferred}))^2 + \\ (1 - P(\text{TRUE}|\text{preferred}))^2 + \\ (1 - P(4.5|\text{preferred}))^2 + D(\_:x)^2\end{array}},$$

$$\text{where } D(\_:x) = \sqrt{\frac{(1 - F(\text{"Sunnyvale"}|\text{preferred}))^2 + (1 - F(\text{"123 Murphy St."}|\text{preferred}))^2}{2}}.$$

In another embodiment, the scoring module 213 applies another scoring function based on Naïve-Bayes classification algorithms to score an affinity for a place. For one place to be scored, the scoring module 213 calculates the Naïve-Bayes probability of it being preferred. For two places to be scored, the scoring module 213 compares the probabilities of them being preferred and determines which one of them is more likely to be preferred by the user. For example, the scoring module 213 calculates the probability for ABC Bank being preferred in the example shown in FIG. 16 as follows:

$$P(\text{preferred}|Bof\text{ ABC\_94086}) =$$

$$P(\text{preferred}) \times \frac{P(\text{"ABC Bank"}|\text{preferred})}{P(ABC\text{ Bank})} \times \frac{P(2353|\text{preferred})}{P(2359)} \times$$

$$\frac{P(\text{TRUE}|\text{preferred})}{P(\text{TRUE})} \times \frac{P(4.5|\text{preferred})}{P(4.5)} \times \frac{P(\_:x|\text{preferred})}{P(\_:x)}$$

$$\text{Where, } \frac{P(\_:x|\text{preferred})}{P(\_:x)} =$$

$$\frac{P(\text{"Sunnyvale"}|\text{preferred})}{P(\text{"Sunnyvale"})} \times \frac{P(\text{"123 Murphy St."}|\text{preferred})}{P(\text{"123 Murphy St."})}.$$

The updating module 215 is code and routine for updating a place affinity model. In one embodiment, instead of building the entire preference model from scratch every time when a new place is added, the updating module 215 applies an incremental approach to build the preference module. For example, once a new place is received, the updating module 215 retrieves a place affinity model for a user from the storage 118 and updates the place affinity model for the user based at least in part on place data describing the new place that a user has visited.

In one embodiment, the updating module 215 retrieves a previous state of the place affinity model for the user from the model data described below with reference to FIG. 3A. In one embodiment, the updating module 215 generates a place affinity model associated with the user based at least in part on the rich place data and the previous state of the place affinity model as described below with reference to FIG. 3A. In another embodiment, the updating module 215 retrieves a default standard-user place affinity model from model data described below with reference to FIG. 3A and generates a place affinity model associated with the user based at least in part on the rich place data and the default standard-user place affinity model. In yet another embodiment, the updating module 215 retrieves an average-user place affinity model from the model data described below with reference to FIG. 3A and generates a place affinity model associated with the user based at least in part on the rich place data and the average-user place affinity model.

In one embodiment, the updating module 215 optimizes the place affinity model so that it only contains a certain number of most recent preferred places. In this way, the performance of the model would not start degrading due to the increasing size of the model. The updating module 215 also does optimization to reduce disk writes by using a delayed write of the preference model. The updating module 215 is described in more detail below with reference to FIGS. 12A-12B.

The personalization module 217 is code and routines for providing a personalized search result to a user. The personalization module 217 provides a personalized result to a user based on the user's request. For example, a user searches for banks nearby using the navigation system 102, when in a place the user does not know much about. The personalization module 217 cooperates with other components in the system 100 to provide a personalized search result to the user.

The personalization module 217 receives a search request from a user to search for a place (e.g., a bank, a gas station, etc.) and inquires the search server 124 for one or more matching results. The search server 124 returns one or more matching places matched to the search request to the personalization module 217. In one embodiment, the personalization module 217 searches one or more data sources to determine one or more matching places matched to the search request. The personalization module 217 sends the matching places to the scoring module 213 and instructs the scoring module 213 to generate an affinity score for each matching place. The personalization module 217 personalizes the matching places based at least in part on the affinity scores and presents a personalized result to the user. The personalization module 217 is described below in more detail with reference to FIG. 14.

In one embodiment, the number of matching places displayed to a user driving a vehicle is restricted for safety considerations to minimize distractions for the user. The personalization module 217 sorts the matching places in an order based at least in part on the affinity scores and determines one or more matching places with the highest affinity scores as the personalized results presented to the user.

In one embodiment, the system 100 is particular advantageous since, for example, the place estimation module 205 automatically estimates any place that a user has visited based at least in part on a location of the vehicle. In one embodiment, the location of the vehicle is different from the place the user visits since, for example, the user may park a vehicle on a street and visits a store across the street. Furthermore, the liking module 207 automatically determines whether the user likes the visited place and does not require any manual inputs from the user. In one embodiment, the place affinity module 112 establishes a place affinity model that is able to estimate an affinity score for both a historical place that the user has visited and a new place that the user has not visited before.

Storage 118

Figure 3A:
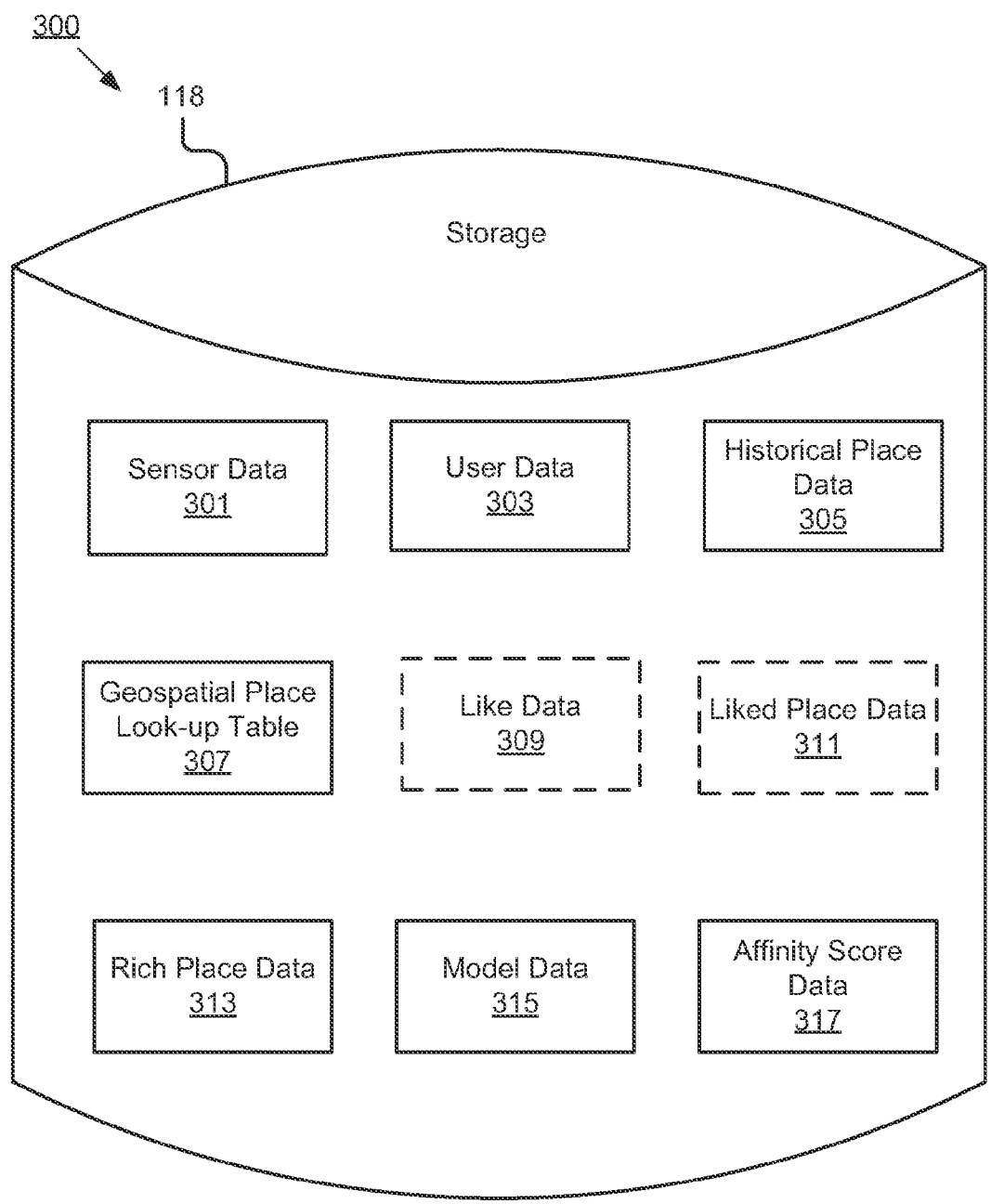
FIG. 3A is a block diagram illustrating a storage according to one embodiment.

FIG. 3A is a block diagram 300 illustrating storage 118 according to one embodiment. The storage 118 includes sensor data 301, user data 303, historical place data 305, geospatial place look-up table 307, like data 309, liked place data 311, rich place data 313, model data 315 and affinity score data 317. The like data 309 and liked place data 311 are depicted in FIG. 3A using dashed lines to indicate that in one embodiment they are included in the historical place data 305. One skilled in the art will recognize that the storage 118 may include other data for providing functionality described herein.

The sensor data 301 includes location data and timestamp data from one or more of the GPS 110 and the sensor 170. The location data describe a location of a vehicle. The timestamp data describes different times of the day that can be used to estimate a time spent at a place. For example, the sensor 170 determines a time spent at a place based on the time difference between a first timestamp and a second timestamp. In one embodiment, the location data and timestamp data are used to determine a situation for a user.

The user data 303 includes one or more of the identification data, the user authentication data and user profile data. The identification data and the user authentication data are used to authenticate one or more users. The user profile data describes a user's interests, hobbies, etc. In one embodiment, the user profile data also describes one or more social connections of the user. The user profile data for a user can be added to the context of the rich place data for generating a place affinity model for the user.

The historical place data 305 describes one or more places that a user has visited. The one or more places that a user has visited are also referred to as one or more POIs that the user has visited. In one embodiment, the historical place data 305 also includes like data 309 associated with the one or more visited places indicating if a user likes them or not. For example, the historical place data 305 includes data describing one or more of each place visited by a user, a visiting frequency to the place, a time spent at the place for each visit to the place and like data 309 for the place. In one embodiment, the historical place data 305 also includes liked place data 311 describing one or more places that a user likes.

The geospatial place look-up table 307 is a table used to look up for candidate places associated with a vehicle location. For example, the place estimation module 205 receives location data describing a vehicle location from the sensor 170 and queries the geospatial place look-up table 307 for candidate places within a certain range (e.g., 100 meters) of the vehicle location.

The like data 309 is data indicating if a user likes a place or not. In one embodiment, the liking module 207 determines the like data 309 for a place. If the liking module 207 determines that a user likes a place, the place is referred to as a liked place or a preferred place. Alternatively, the like data describes that the user does not like a place. The like data 309 is depicted using a dashed line in the FIG. 3A to indicate that it can be stored along with one or more places included in the historical place data 305.

The liked place data 311 describes one or more liked places that a user likes. In one embodiment, the liking module 207 determines one or more liked places and stores them in the storage 118. The liked place data 311 is depicted in the FIG. 3A using a dashed line to indicate that it can be alternatively stored in the historical place data 305.

The rich place data 313 is a variety of data associated with a place for a user from a plurality of data sources. For example, the gathering module 209 retrieves data for a liked place from one or more of the historical place data stored in the storage 118, the search server 124, the web server 138, the mobile device 134, the client 130 and the social network server 120, etc. The rich place data 313 as well as other data such as the sensor data 301 is used to generate a place affinity model for a user. In one embodiment, the rich place data 313 includes an affinity value for a place marked by a user based on inputs from different sources.

The model data 315 describes one or more place affinity models for a user. For example, a place affinity model characterizes a place preference for a user and includes model data describing all the favorite places for the user and the common characteristics for the favorite places. In one embodiment, the model data 315 includes a default standard-user place affinity model pre-computed for one or more groups of users based on empirical evidence. In another embodiment, the model data 315 includes an average-user place affinity model built by aggregating one or more individual place affinity models for a group of users.

The affinity score data 317 describes one or more affinity scores for one or more places that can be either visited by the user or not visited by the user. In one embodiment, the scoring module 213 estimates an affinity score for a place using a place affinity model for a user based at least in part on the rich place data, the user profile data, the situation data and sensor data describing the time and the location, etc. In another embodiment, the scoring module 213 generates the affinity scores for matching places to a search request from a user.

Figure 3B:
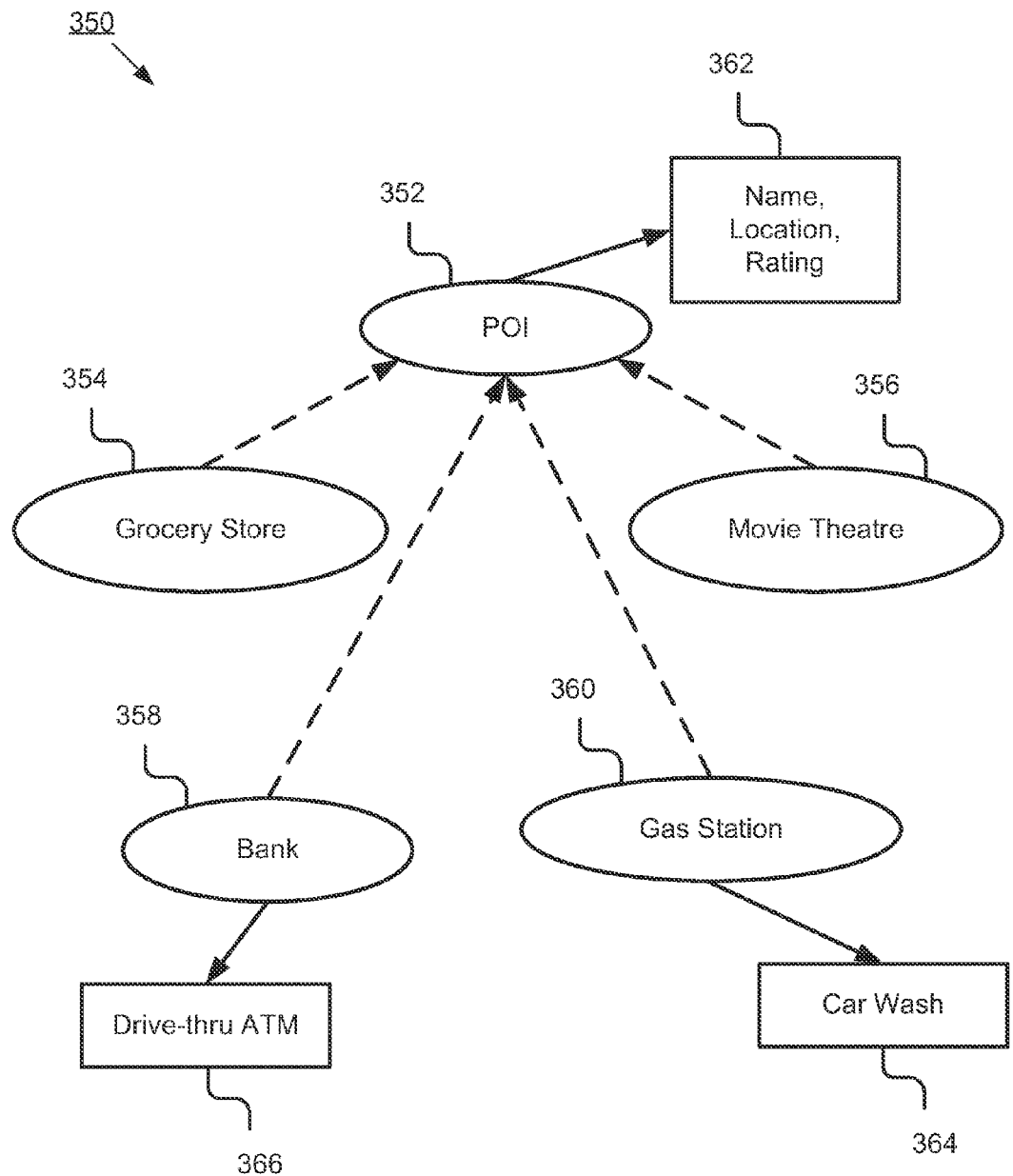
FIG. 3B is a block diagram illustrating a place ontology subset included in the storage according to one embodiment.

FIG. 3B is a block diagram illustrating a place ontology subset 350 included in the storage 118 according to one embodiment. The place ontology subset 350 characterizes a concept hierarchy of places based on their categories and the properties associated with place types. Element 352 is a graphic representation of a data type describing a POI, which is on the highest level of this ontology 350. Element 362 is a graphic representation of data describing properties associated with the POI 352.

Elements 354, 356, 358, 360 are graphic representations of data types describing a grocery store 354, a movie theatre 356, a bank 358 and a gas station 360, respectively. They are on a lower level than the POI 352. In other words, they are different types of POIs. Element 366 is a graphic representation of data describing properties associated with the bank 358. Element 364 is a graphic representation of data describing properties associated with the gas station 360.

Methods

Figure 4:
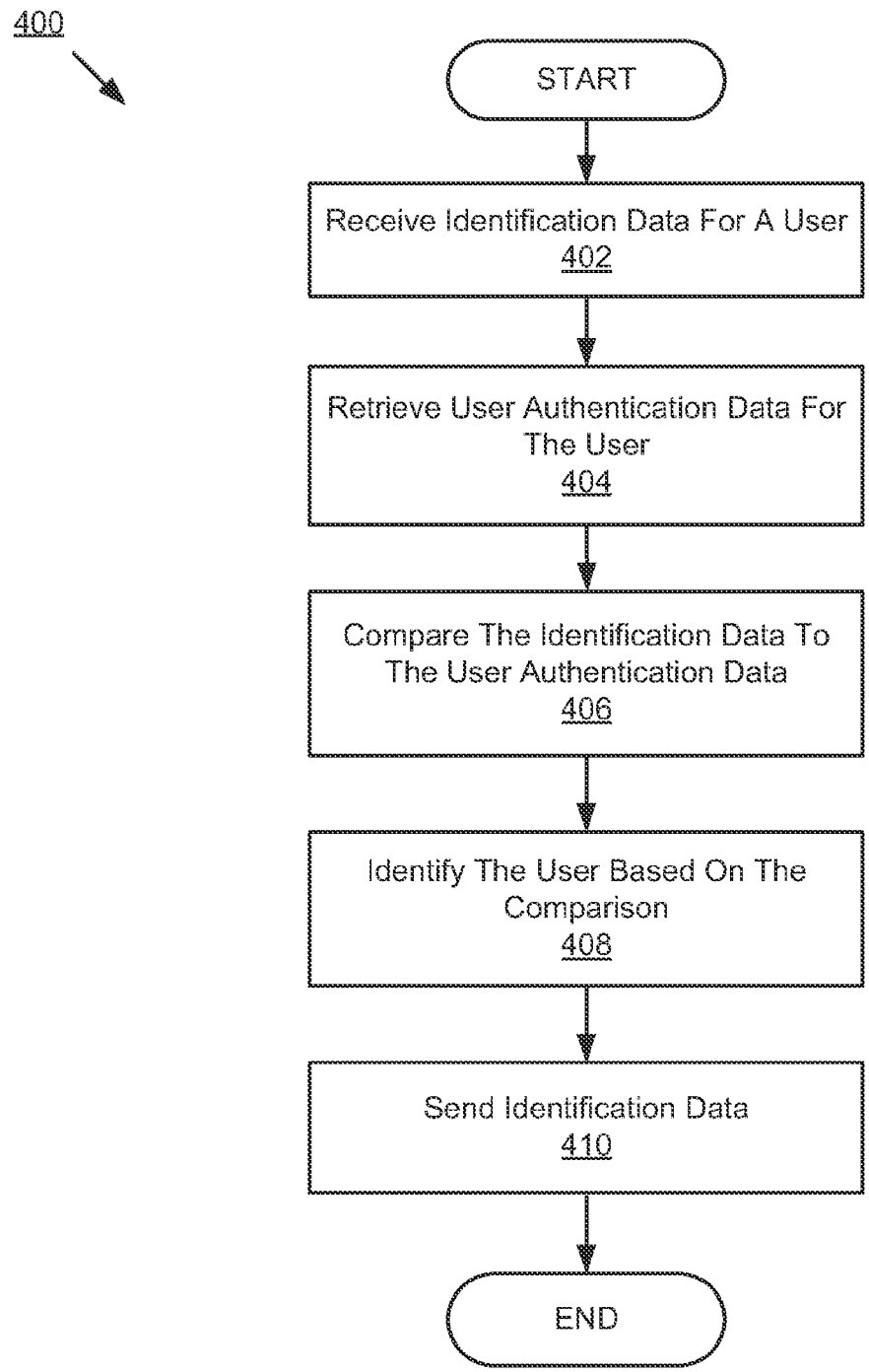
FIG. 4 is a flow diagram illustrating a method for identifying a user according to one embodiment.

FIG. 4 is a flow diagram illustrating a method 400 for identifying a user according to one embodiment. In one embodiment, method 400 is implemented by the identification module 203. The identification module 203 receives 402 identification data for a user from the communication module 201. For example, when a user inputs identification data via a GUI generated by the navigation system 102, the identification module 203 receives the identification data for the user via the communication module 201. In one embodiment, the identification data is a user name and a password.

The identification module 203 retrieves 404 user authentication data for the user from the user data 303 included in the storage 118 and compares 406 the identification data to the user authentication data. The identification module 203 identifies 408 the user based on the comparison. If the identification module 203 determines that the identification data matches the user authentication data based on the comparison, then the identification module 203 identifies the user and sends 410 the identification data to other components of the place affinity module 112 such as the place estimation module 205.

Figure 5:
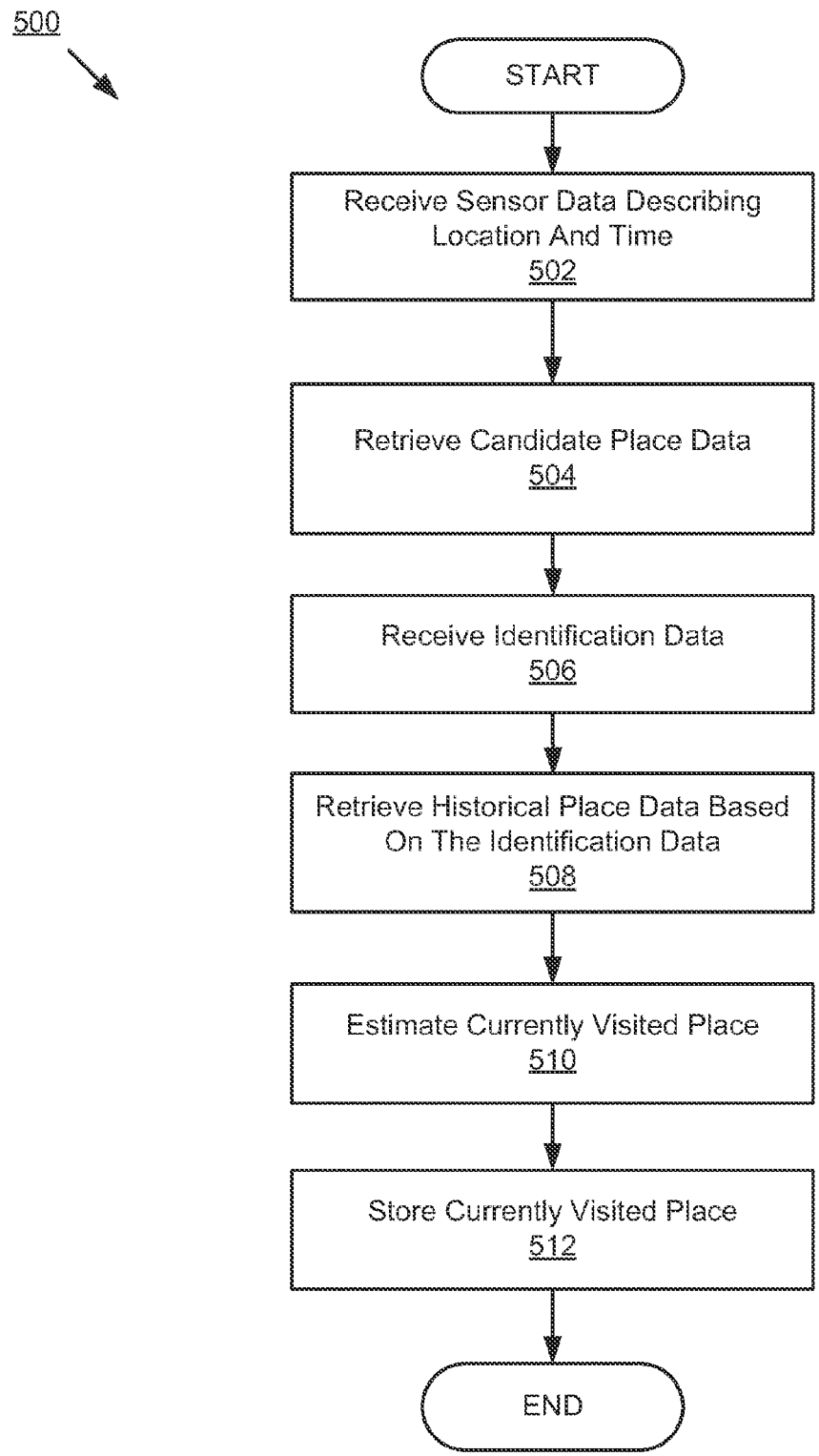
FIG. 5 is a flow diagram illustrating a method for estimating a currently visited place according to one embodiment.

FIG. 5 is a flow diagram illustrating a method 500 for estimating a currently visited place according to one embodiment. In one embodiment, method 500 is implemented by the place estimation module 205. The place estimation module 205 receives 502 sensor data describing a vehicle location and a time of the day. Based on the vehicle location, the place estimation module 205 queries the geospatial place look-up table 307 in the storage 118 and retrieves 504 candidate place data from the geospatial place look-up table 307. The candidate place data describes one or more candidate places within a certain range (e.g., 100 meters) of the vehicle location.

The place estimation module 205 receives 506 identification data for a user from the identification module 203 and retrieves 508 historical place data based on the identification data for the user. For example, the retrieved historical place data includes one or more places visited by the user in the past that are close to the vehicle location.

The place estimation module 205 estimates 510 a currently visited place based at least in part on one or more of the vehicle location, the time, the identification data, the historical place data and the candidate place data. For example, the place estimation module 205 selects a place from the one or more candidate places as a currently visited place based on the time of the day and the time spent at the place. The place estimation module 205 stores 512 the estimated currently visited place in the storage 118 as a part of the historical place data for the user.

Figure 6:
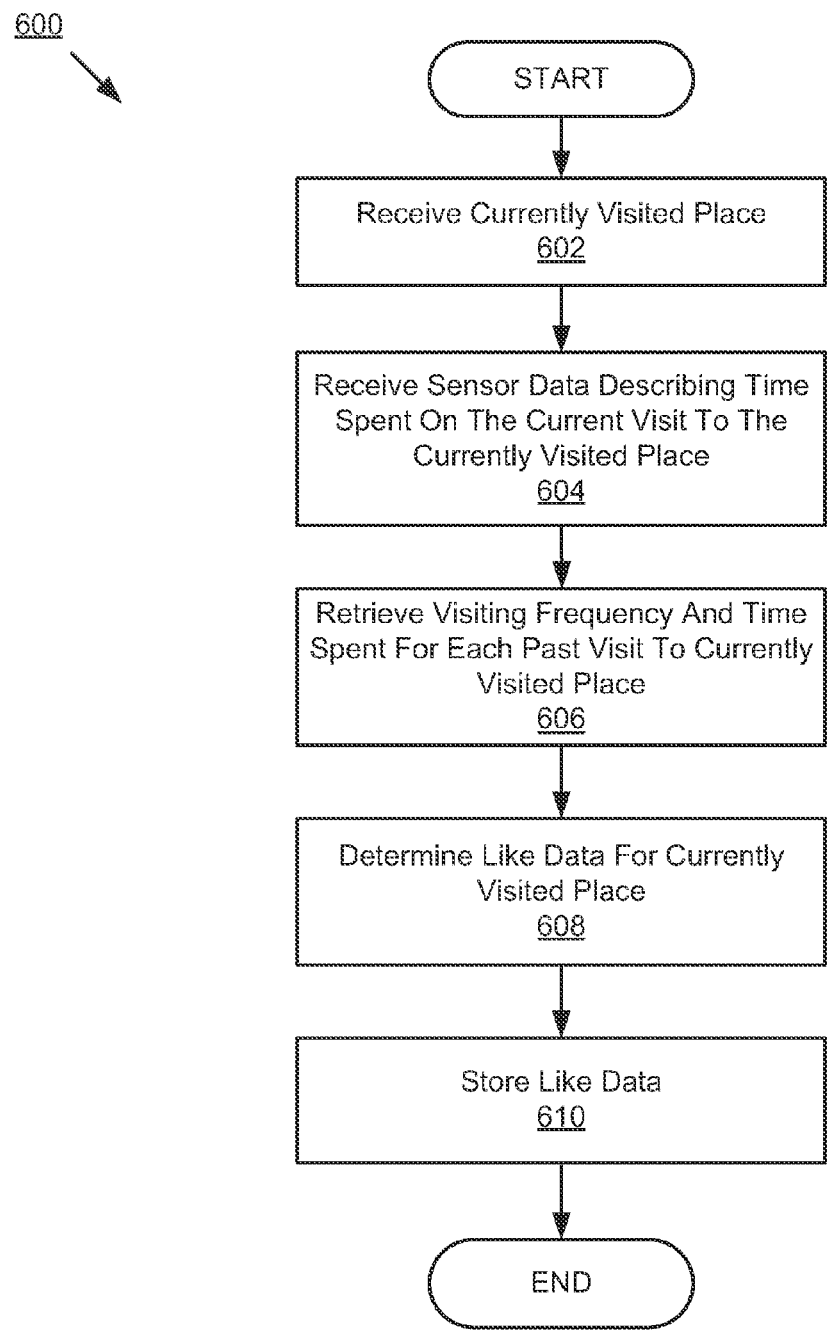
FIG. 6 is a flow diagram illustrating a method for determining like data for a currently visited place according to one embodiment.

FIG. 6 is a flow diagram illustrating a method 600 for determining like data for a currently visited place according to one embodiment. In one embodiment, method 600 is implemented by the liking module 207. The liking module 207 receives 602 the currently visited place from the place estimation module 205 and identification data from the identification module 203. The liking module 207 also receives 604 sensor data describing the time spent on the current visit to the currently visited place from the sensor 170 and retrieves 606 a visiting frequency and time spent for each past visit to the currently visited place from the historical place data in the storage 118.

The liking module 207 determines 608 like data for the currently visited place based at least in part on one or more of the place data, the identification data, the time spent for the current visit, the visiting frequency and the time spent for each past visit. In one embodiment, the like data describes that the user likes the currently visited place and the place is referred to as a liked (or preferred) place. In another embodiment, the like data indicates that the user does not like the place and the place is referred as a not-liked (or not-preferred) place. The liking module 207 stores 610 the like data in the storage 118.

Figure 7:
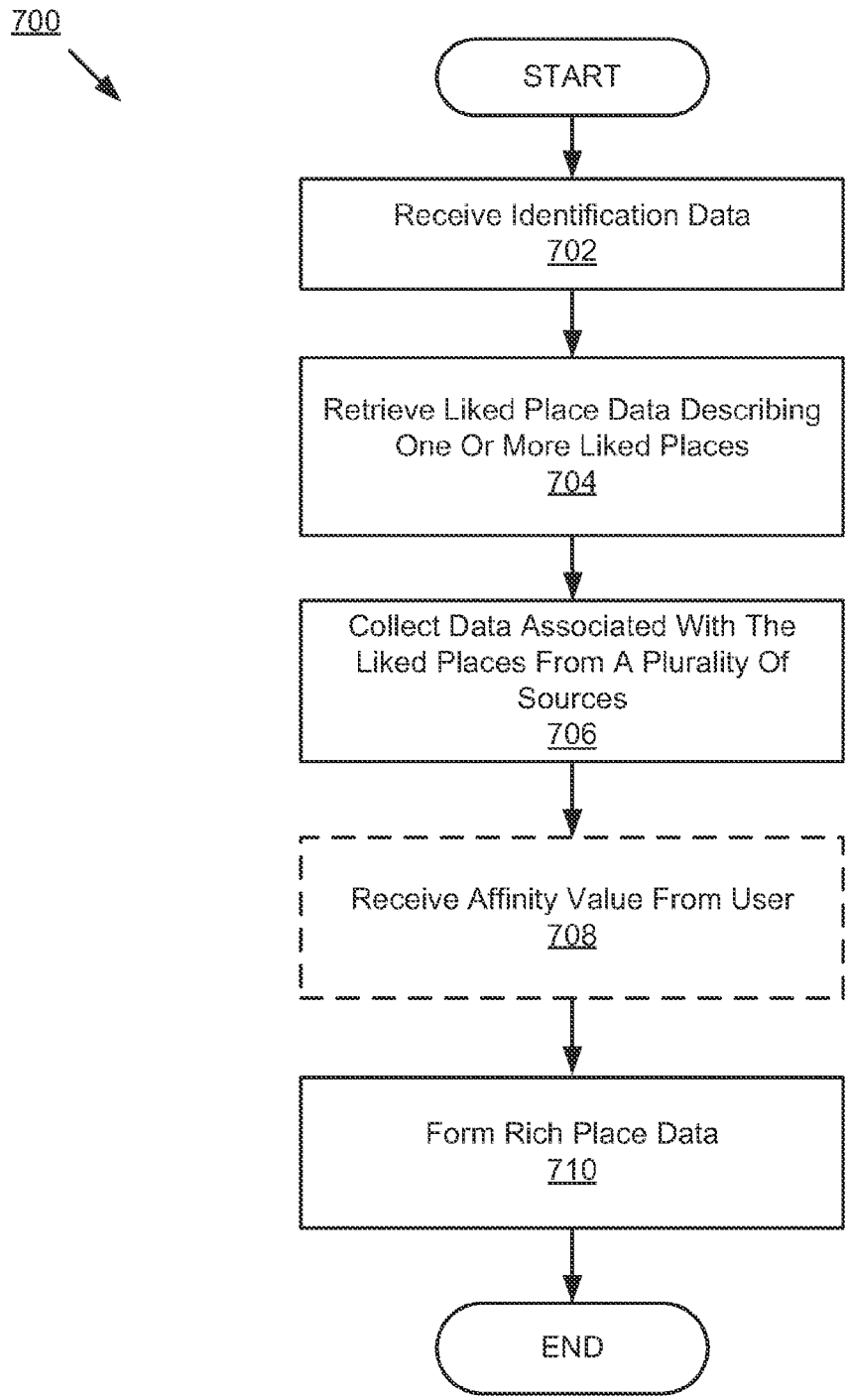
FIG. 7 is a flow diagram illustrating a method for forming rich place data for a place according to one embodiment.

FIG. 7 is a flow diagram illustrating a method 700 for forming rich place data for a place according to one embodiment. In one embodiment, method 700 is implemented by the gathering module 209. The gathering module 209 receives 702 identification data for a user from the identification module 203 and retrieves 704 liked place data describing one or more liked places for the user.

The gathering module 209 collects 706 data associated with the one or more liked places from a plurality of sources. For example, the gathering module 209 retrieves data for the one or more liked places from one or more of the search server 124, the web server 138, the mobile device 134, the client 130 and the social network server 120, etc. For example, the retrieved data includes data describing social connections (e.g., friends) of the user on a social network that have visited one or more of the liked places.

In one embodiment, the gathering module 209 receives 708 an affinity value for a place marked by the user. For example, the user marks a place with an affinity value based on inputs from an interactive dialog, a survey, retrieved personal data from social networks, etc. The gathering module 209 forms 710 rich place data based on the retrieved data from a plurality of sources and the affinity value from the user.

Figure 8:
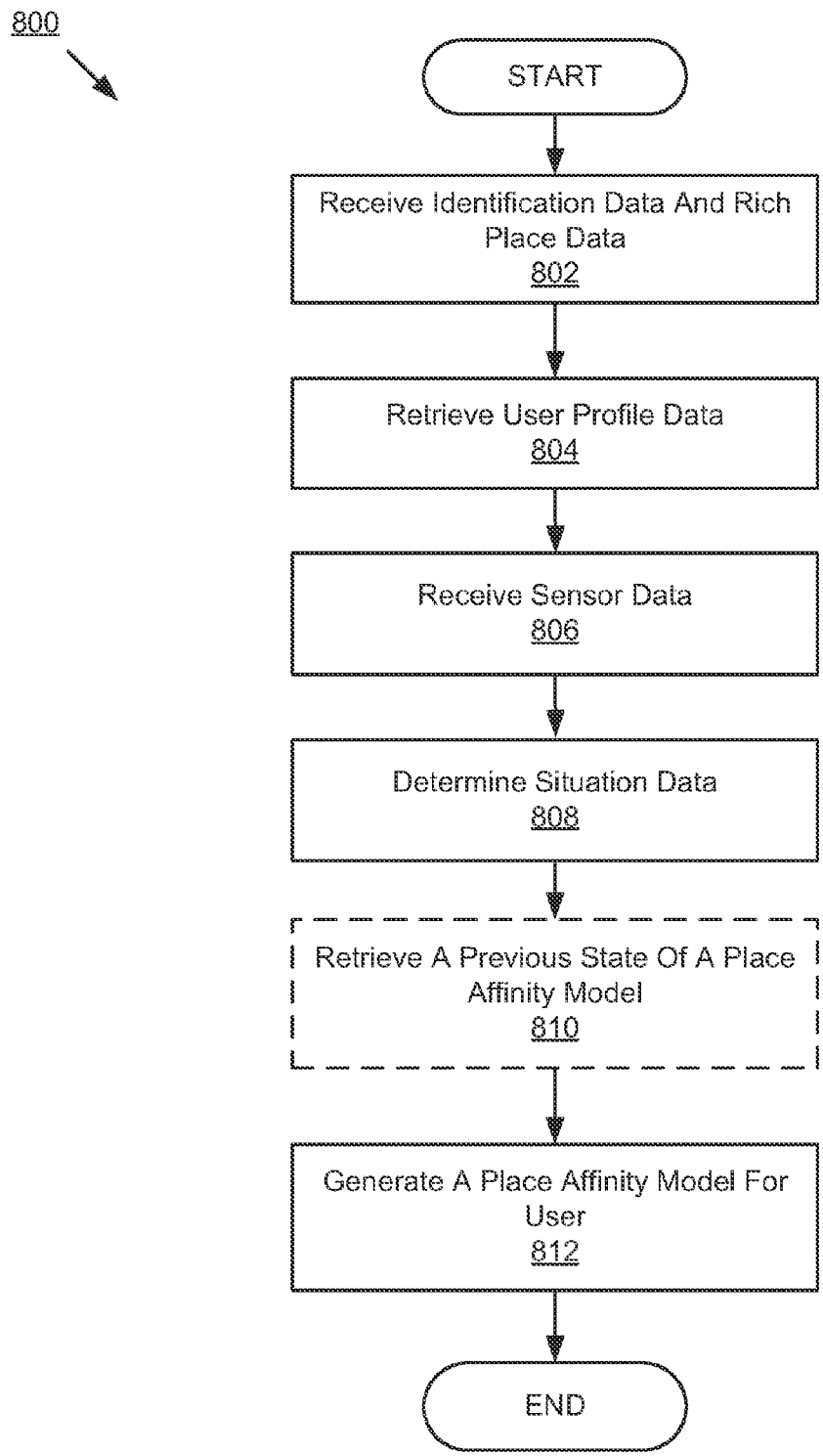
FIG. 8 is a flow diagram illustrating a method for generating a place affinity model for a user according to one embodiment.

FIG. 8 is a flow diagram illustrating a method 800 for generating a place affinity model for a user according to one embodiment. In one embodiment, method 800 is implemented by the modeling module 211. The modeling module 211 receives 802 identification data for a user from the identification module 203 and rich place data from the gathering module 209. The modeling module 211 also retrieves 804 user profile data for the user from the storage 118 based on the identification data and receives 806 sensor data from one or more of the sensor 170 and the GPS 110. In one embodiment, the sensor data describes a vehicle location and a time.

The modeling module 211 determines 808 situation data describing a situation of the user based on the sensor data. For example, the modeling module 211 determines that the user is out for shopping based on that the time spent at the place is more than two hours and the vehicle location is at a parking lot of a shopping mall. In one embodiment, the modeling module 211 retrieves 810 a previous state of a place affinity model from the model data 315. The modeling module 211 estimates 812 a place affinity model for the user based at least in part on the user profile data, the rich place data, the situation data and the previous state of a place affinity model, etc. For example, a place affinity model describes a place preference for a user.

Figure 9:
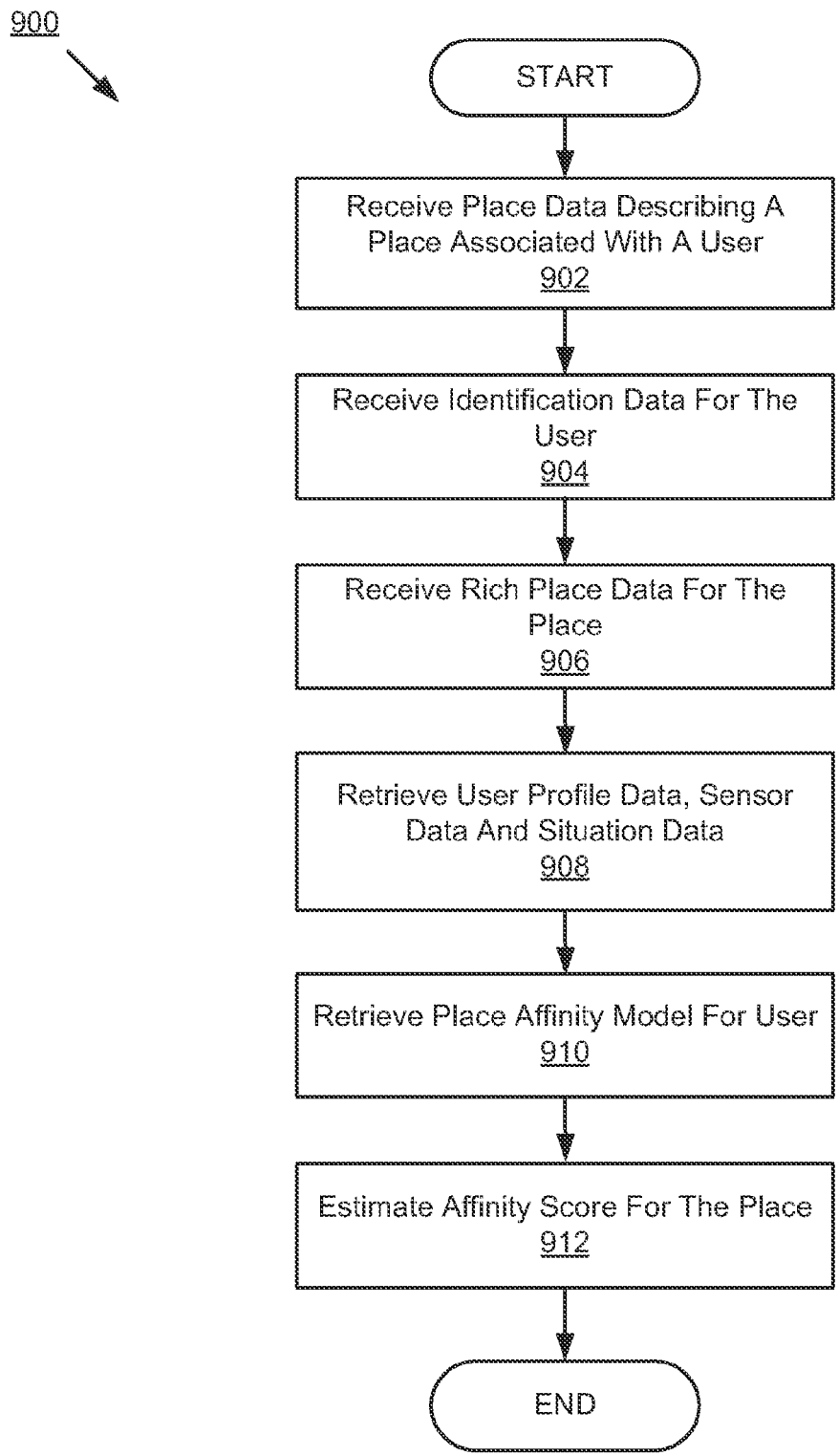
FIG. 9 is a flow diagram illustrating a method for estimating an affinity score for a place according to one embodiment.

FIG. 9 is a flow diagram illustrating a method 900 for estimating an affinity score for a place according to one embodiment. In one embodiment, method 900 is implemented by the scoring module 213. The scoring module 213 receives 902 place data describing a place associated with a user. In one embodiment, the place is a currently visited place by the user. In another embodiment, the place is a matching place for a search request from the user.

The scoring module 213 receives 904 identification data for the user from the identification module 203 and receives 906 rich place data for the place from the gathering module 209. The scoring module 213 also retrieves 908 user profile data from the storage 118 and sensor data and situation data from the sensor 170.

The scoring module 213 retrieves 910 a place affinity model for the user from the storage 118 and estimates 912 an affinity score for the place using the place affinity model based at least in part on the rich place data, the user profile data, the situation data and sensor data, etc.

Figure 10A:
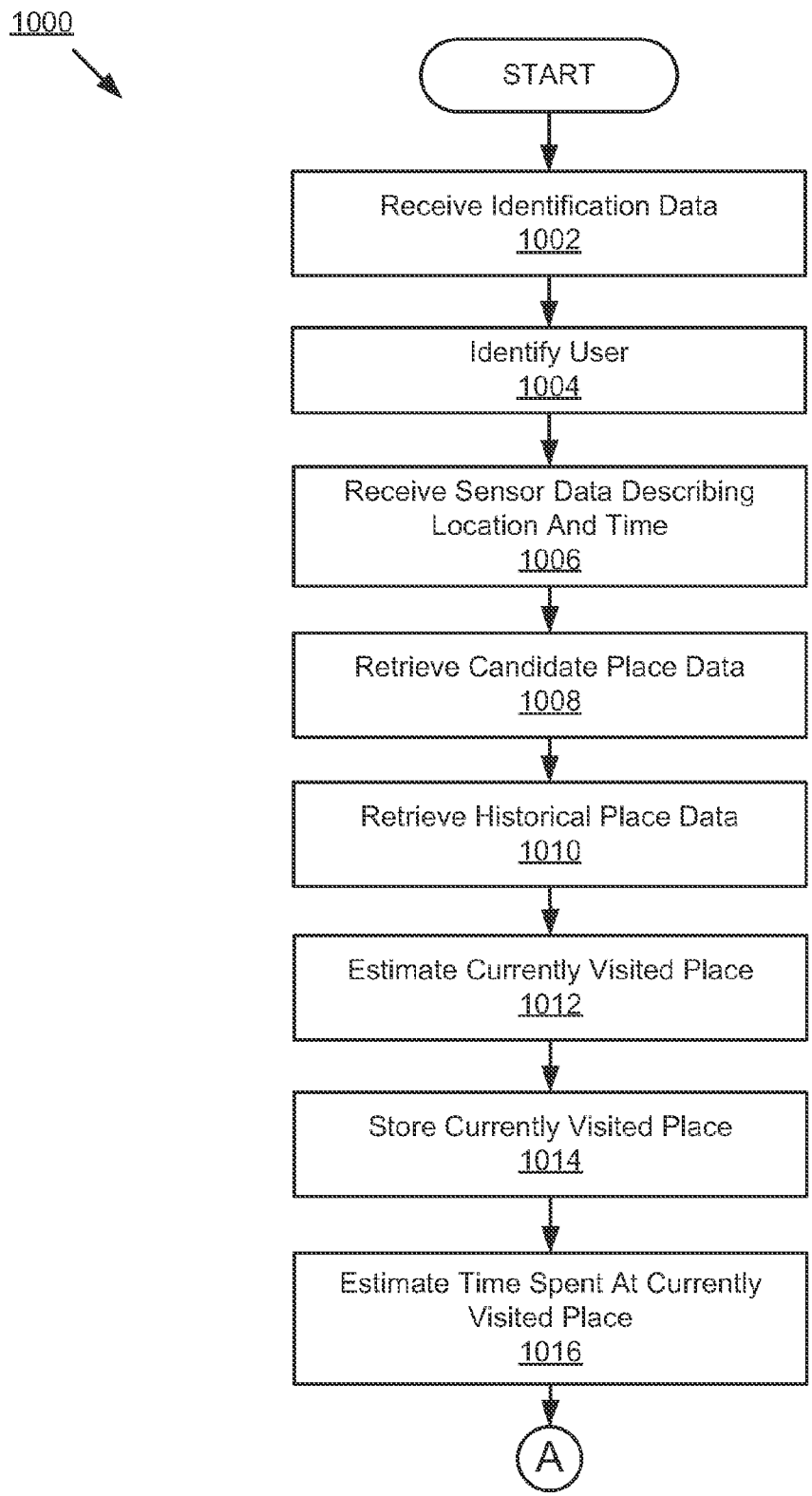
FIGS. 10A-10B are flow diagrams illustrating a method for estimating a currently visited place according to another embodiment.
Figure 10B:
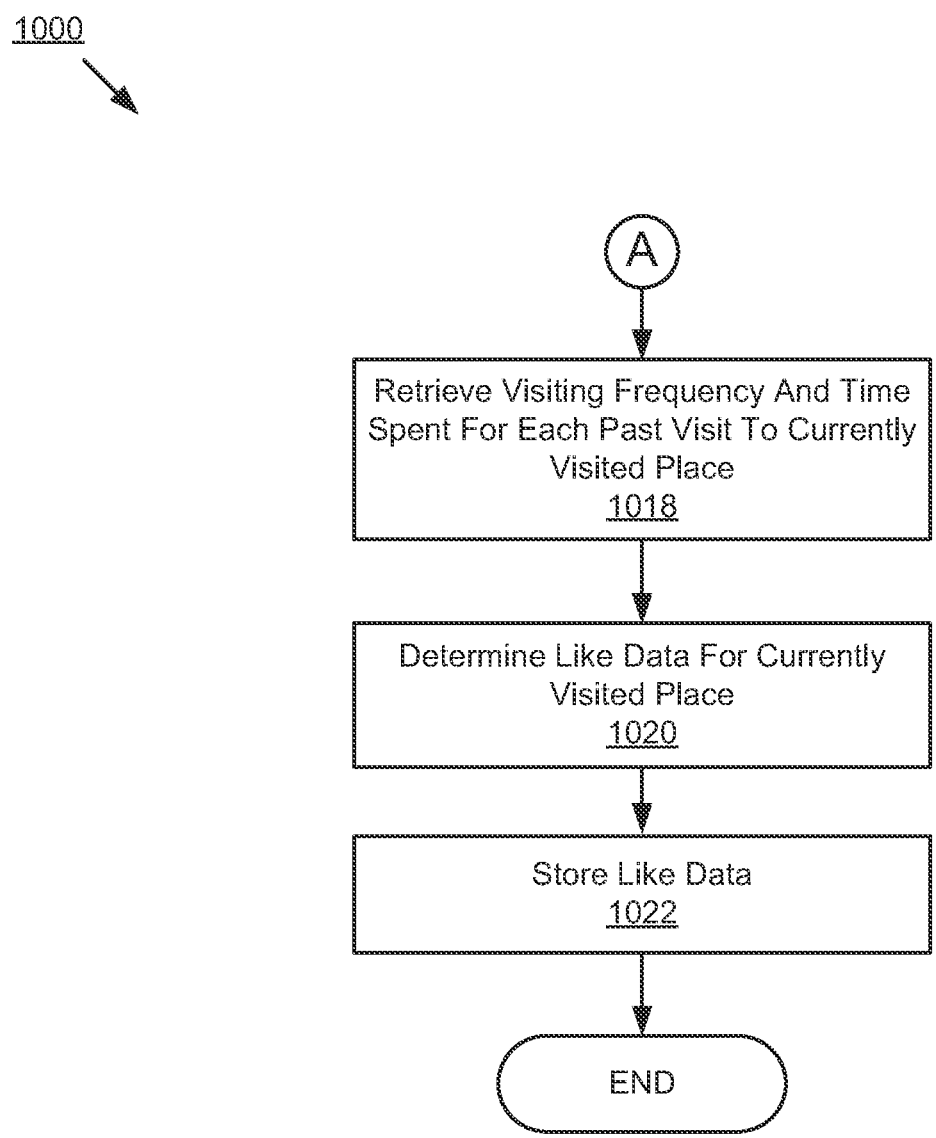

FIGS. 10A-10B are flow diagrams illustrating a method 1000 for estimating a currently visited place according to another embodiment.

Referring to FIG. 10A, the communication module 201 receives 1002 identification data from a user and sends the identification data to the identification module 203. The identification module 203 identifies 1004 the user based at least in part on the identification data. For example, the identification module 203 identifies the user by comparing the identification data to the user authorization data stored in the storage 118.

The communication module 201 receives 1006 sensor data describing a current location for a vehicle and a current time and sends the sensor data to the place estimation module 205. The communication module 201 retrieves 1008 candidate place data from a geospatial look-up table of places based at least in part on the location of the vehicle. In one embodiment, the candidate place data includes one or more candidate places within a pre-determined distance to the location of the vehicle. The communication module 201 retrieves 1010 historical place data associated with the user from the storage 118. The communication module 201 sends the candidate place data and the historical place data to the place estimation module 205.

The place estimation module 205 estimates 1012 a currently visited place for the user based at least in part on one or more of the sensor data, the candidate place data and the historical place data. The place estimation module 205 stores 1014 the currently visited place in the storage 118. In one embodiment, the place estimation module 205 sends the currently visited place to the liking module 207. The sensor 170 estimates 1016 a time spent at the currently visited place for the user.

Referring now to FIG. 10B, the liking module 207 retrieves 1018 a visiting frequency for the currently visited place and the time spent at the place for each past visit from the historical place data stored in the storage 118. The liking module 207 determines 1020 like data for the currently visited place based at least in part on the visiting frequency and the time spent for each visit to the place. The liking module 207 stores 1024 the like data in the storage 118.

Figure 11:
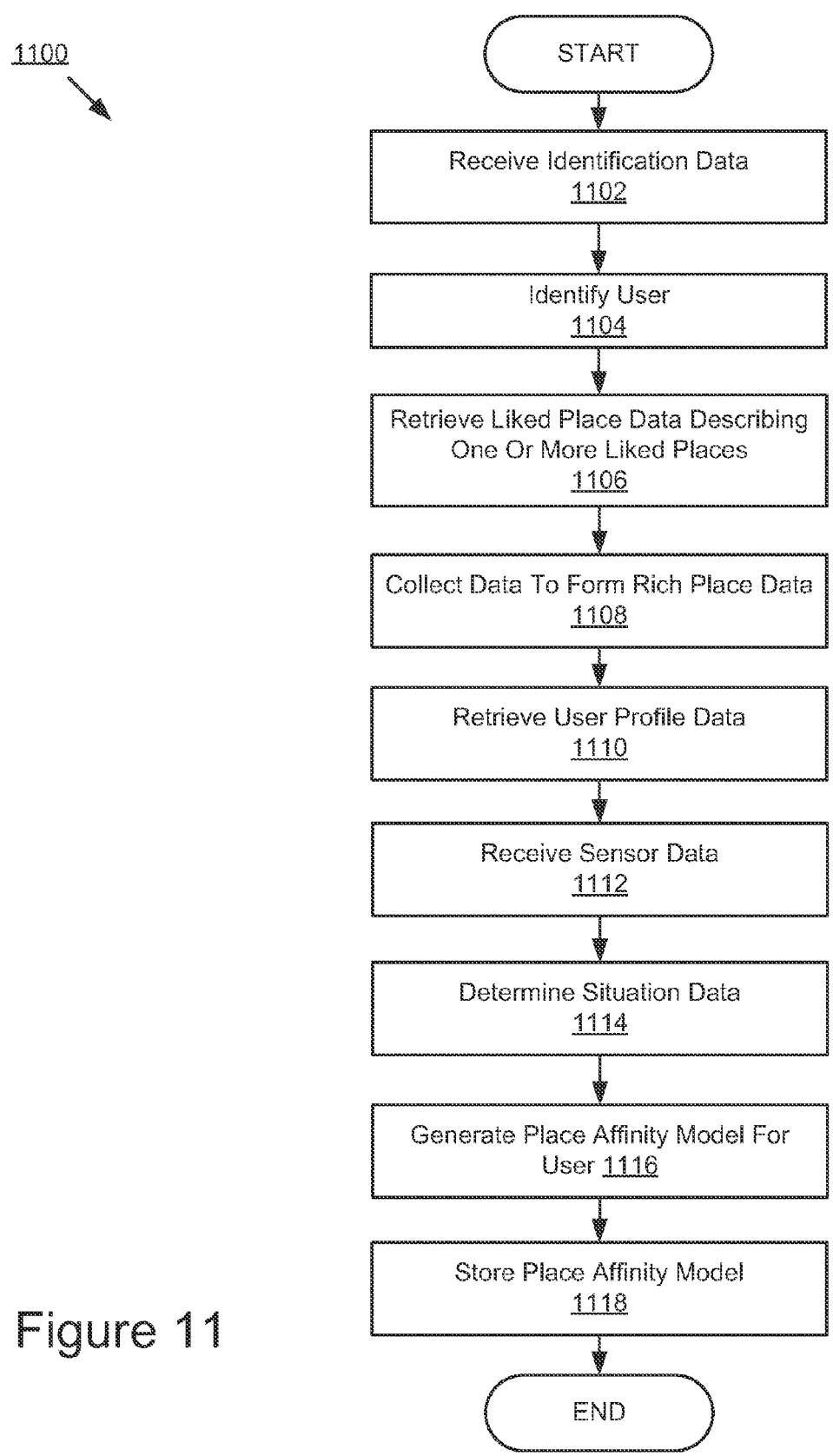
FIG. 11 is a flow diagram illustrating a method for estimating a place affinity model according to another embodiment.

FIG. 11 is a flowchart illustrating a method 1100 for generating a place affinity model according to one embodiment. The communication module 201 receives 1102 identification data for a user and sends the identification data to the identification module 203. The identification module 203 identifies 1104 the user based at least in part on the identification data and sends the identification data for the user to one or more of the gathering module 209 and the modeling module 211. The communication module 201 retrieves 1106 liked place data describing one or more liked places for the user from the storage 118 and sends the liked place data to the gathering module 209. Alternatively, in one embodiment, the communication module 201 retrieves place data describing one or more places associated with the user, where the one or more places include both one or more liked places and one or more not-liked places.

The gathering module 209 collects 1108 additional data for the one or more liked places from a plurality of data sources (e.g., a social network provided by the social network application 122, the search server 124, the web server 138, etc.) to form rich place data for the one or more liked places. The gathering module 209 sends the rich place data to the modeling module 211.

The communication module 201 retrieves 1110 user profile data for the user from the storage 118 and sends the user profile data to the modeling module 211. The communication module 201 receives 1112 sensor data describing one or more of a vehicle location and a current time, etc. In one embodiment, the sensor data includes other data such as temperature data, traffic condition data, etc. The communication module 201 sends the sensor data to the modeling module 211. The modeling module 211 determines 1114 situation data describing a situation for the user based at least in part on the sensor data. The modeling module 211 generates 1116 a place affinity model for the user based at least in part on one or more of the rich place data, the user profile data, the sensor data and the situation data, etc. The modeling module 211 stores 1118 the place affinity model in the storage 118.

Figure 12A:
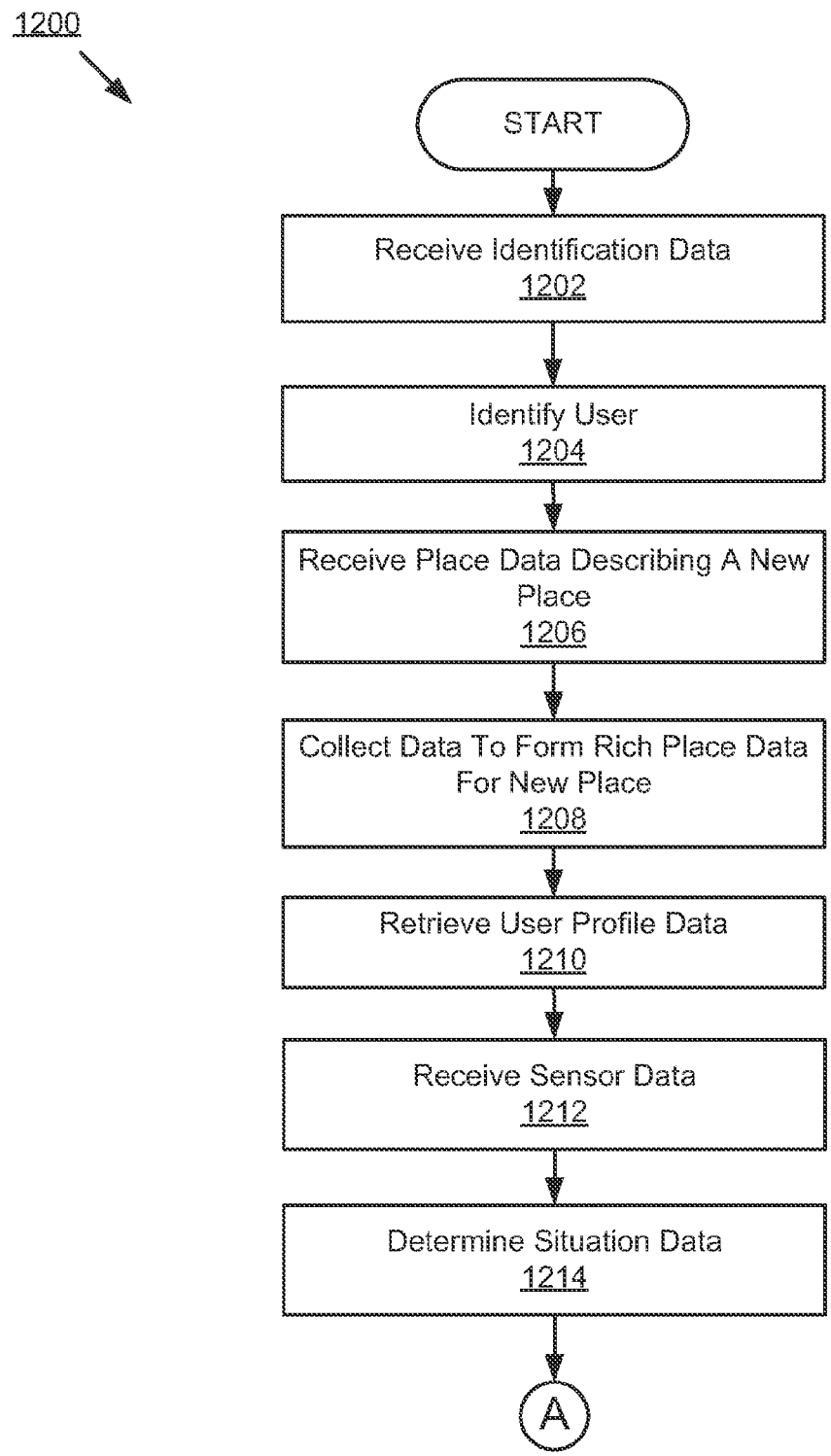
FIGS. 12A-12B are flow diagrams illustrating a method for updating a place affinity model according to one embodiment.
Figure 12B:
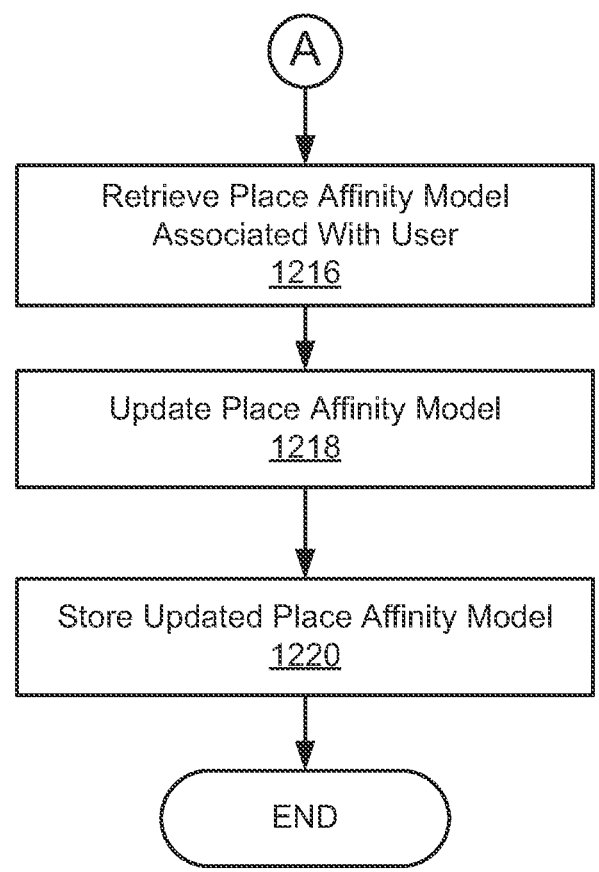

FIGS. 12A-12B are flow diagrams illustrating a method 1200 for updating a place affinity model according to one embodiment.

Referring to FIG. 12A, the communication module 201 receives 1202 identification data for a user and sends the identification data to the identification module 203. The identification module 203 identifies 1204 the user based at least in part on the identification data and sends the identification data for the user to the gathering module 209 and the updating module 215. The gathering module 209 receives 1206 place data describing a new place that the user has visited. In one embodiment, the gathering module 209 receives the place data from the place estimation module 205. In another embodiment, the gathering module 209 retrieves the place data from the historical place data stored in the storage 118 via the communication module 201.

The gathering module 209 collects 1208 data from a plurality of data sources to form rich place data for the new place and sends the rich place data to the updating module 215. The communication module 201 retrieves 1210 user profile data from the storage 118 and sends the user profile data to the updating module 215. The communication module 201 receives 1212 sensor data from the sensor 170 and sends the sensor data to the updating module 215. The updating module 215 determines 1214 situation data describing a situation for the user based at least in part on the sensor data.

Referring now to FIG. 12B, the communication module 201 retrieves 1216 model data describing a place affinity model associated with the user from the storage 118 and sends the model data to the updating module 215. In one embodiment, the communication module 201 retrieves a previous state of a place affinity model associate with the user from the storage 118 and sends it to the updating module 215. In another embodiment, the communication module 201 retrieves a pre-computed default standard user place affinity model from the storage 118 and sends it to the updating module 215. In yet another embodiment, the communication module 201 retrieves an average-user place affinity model from the storage 118 and sends it to the updating module 215.

The updating module 215 updates 1218 the place affinity model associated with the user based at least in part on one or more of the rich place data for the new place, the user profile data, the sensor data and the situation data. The updating module 215 stores 1220 the updated place affinity model in the storage 118.

Figure 13A:
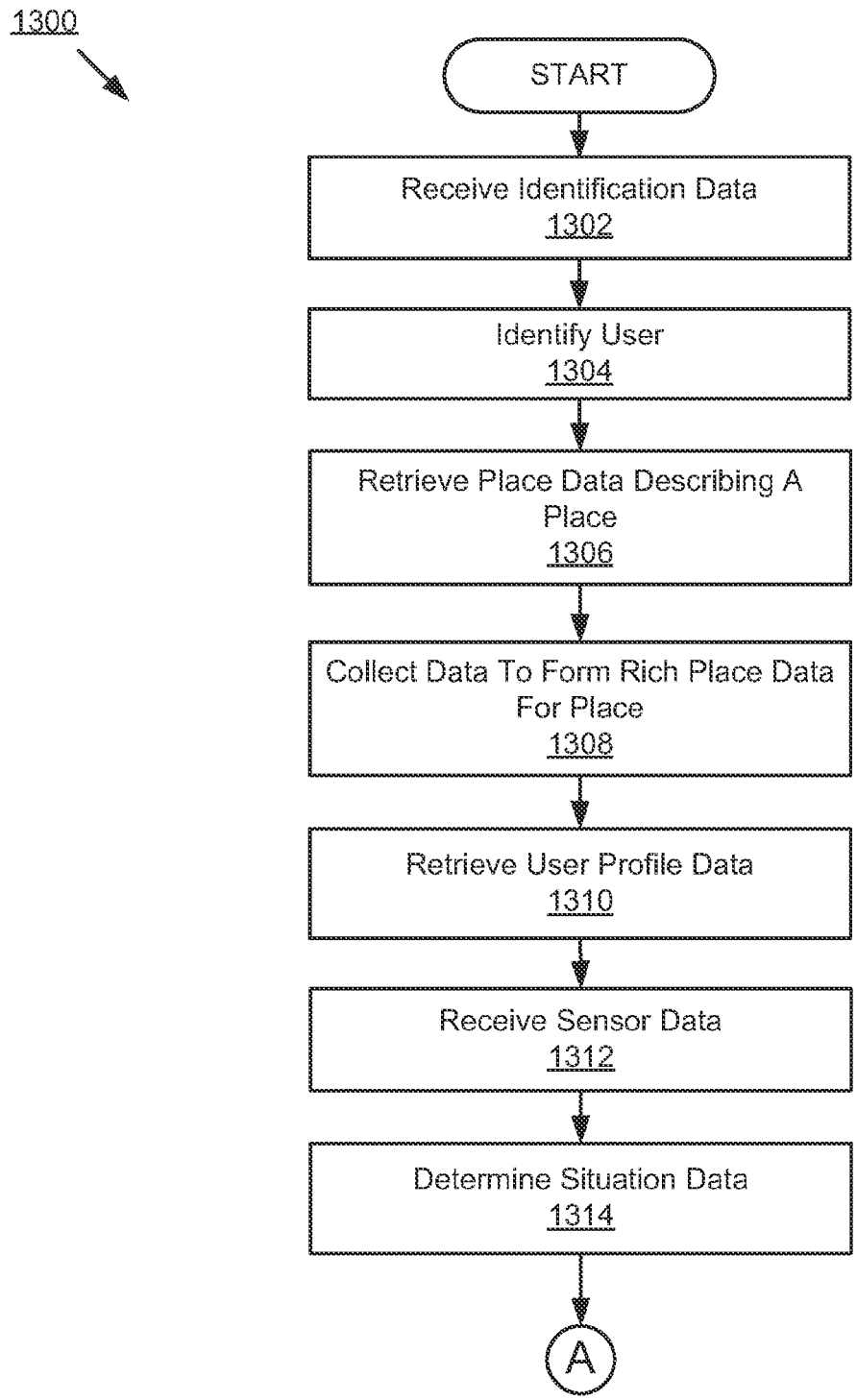
FIGS. 13A-13B are flow diagrams illustrating a method for estimating an affinity score for a place according to another embodiment.
Figure 13B:
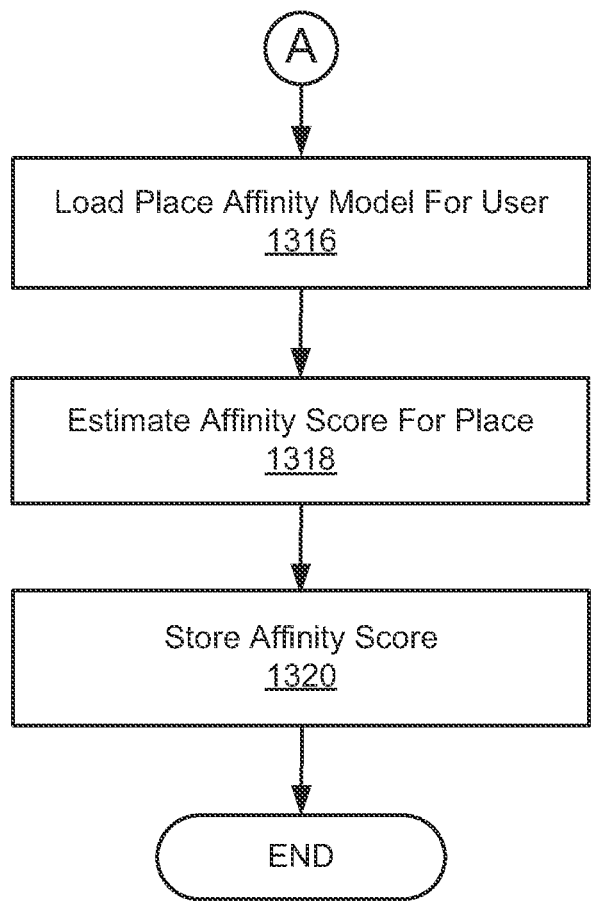

FIGS. 13A-13B are flow diagrams illustrating a method 1300 for estimating an affinity score for a place according to another embodiment. In one embodiment, the place is a place that a user has visited. In another embodiment, the place is a place that the user has not visited before.

Referring to FIG. 13A, the communication module 201 receives 1302 identification data for a user and sends the identification data to the identification module 203. The identification module 203 identifies 1304 the user based at least in part on the identification data and sends the identification data for the user to one or more of the gathering module 209, the modeling module 211 and the scoring module 213. In one embodiment, the gathering module 209 receives 1306 place data describing the place from one of a user, the communication module 201, the personalization module 217, etc. The gathering module 209 collects 1308 data from a plurality of data sources to form rich place data for the place and sends the rich place data to the scoring module 213.

The communication module 201 retrieves 1310 user profile data from the storage 118 and sends the user profile data to the scoring module 213. The communication module 201 receives 1312 sensor data from the sensor 170 and sends the sensor data to the modeling module 211. The modeling module 211 determines 1314 situation data describing a situation for the user based at least in part on the sensor data and sends the situation data to the scoring module 213.

Referring now to FIG. 13B, the scoring module 213 loads 1316 a place affinity model for the user from the storage 118. The scoring module 213 applies the place affinity model to estimate 1318 an affinity score for the user based at least in part on one or more of the rich place data, the sensor data, the situation data and the user profile data. The scoring module 213 stores the affinity score for the place in the storage 118.

Figure 14:
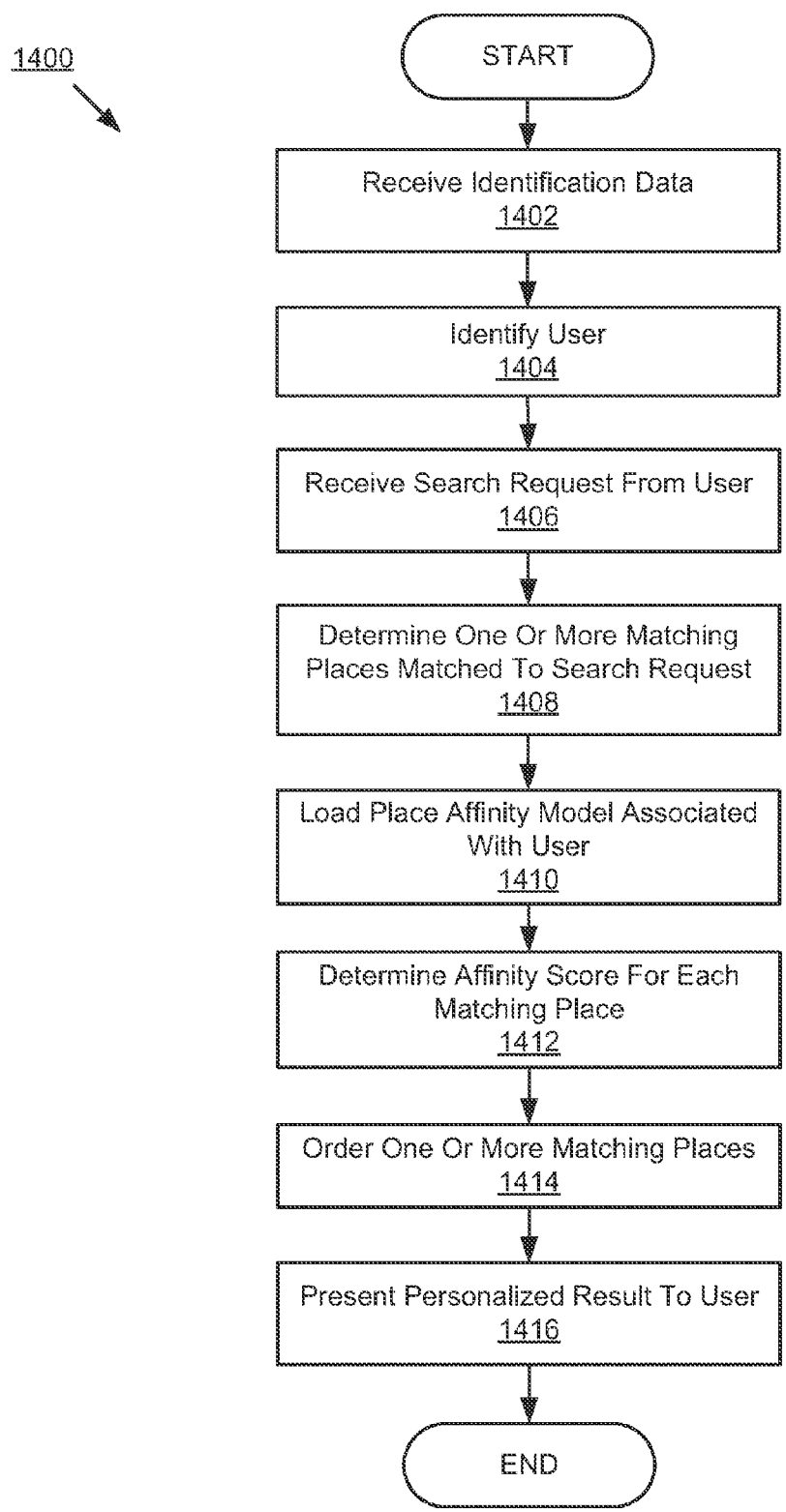
FIG. 14 is a flow diagram illustrating a method for personalizing a place search result for a user according to one embodiment.

FIG. 14 is a flow diagram illustrating a method 1400 for personalizing a place search result for a user according to one embodiment. The communication module 201 receives 1402 identification data for a user and sends the identification data to the identification module 203. The identification module 203 identifies 1404 the user based at least in part on the identification data and sends the identification data for the use to one or more of the scoring module 213 and the personalization module 217.

The communication module 201 receives 1406 a search request from the user searching for one or more POIs. The communication module 201 sends the search request to the personalization module 217. The personalization module 217 determines 1408 one or more matching places matched to the search request. For example, the personalization module 217 instructs the search module 126 to search for one or more matching places and receives the matching places from the search module 126. The personalization module 217 sends the one or more matching places to the scoring module 213. The scoring module 213 loads 1410 a place affinity model associated with the user from the storage 118. The scoring module 213 applies the place affinity model to determine 1412 an affinity score for each matching place and sends the one or more affinity scores for the one or more matching places to the personalization module 217. The personalization module 217 orders 1414 the one or more matching places based at least in part on the one or more affinity scores. The personalization module 217 presents 1416 a personalized result to the user. For example, the personalization module 217 presents to the user a personalized result that includes one or more matching places having the highest affinity scores.

Example of Place Estimation

Figure 15:
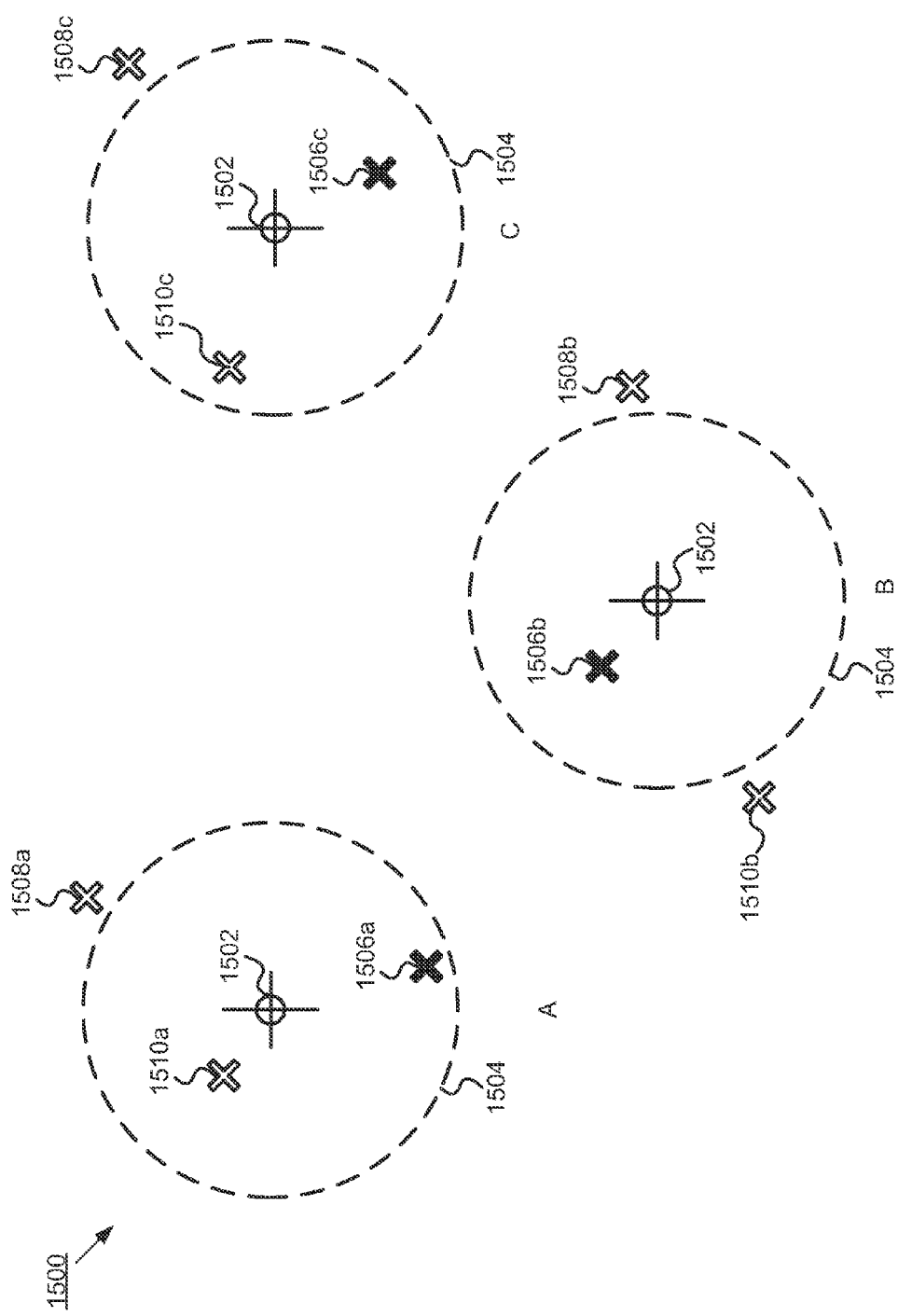
FIG. 15 is a graphical representation illustrating three examples for estimating a currently visited place for a user according to one embodiment.

FIG. 15 is a graphical representation 1500 illustrating three examples (A, B, C) for estimating a currently visited place for a user according to one embodiment. Element 1502 is a graphic location of the vehicle (e.g., a graphic vehicle location) in each example A, B, C. Element 1504 is a graphic circle defining a pre-determined range (e.g., 100 meters) around the vehicle location 1502. The vehicle location 1502 is at the center of the each circle 1504 in each example A, B, C. Elements 1506a, 1508a, 1510a are graphic crosses representing candidate places close to the vehicle location 1502 in the example A. Element 1506a is a graphic solid cross representing a determined currently visited place for the user in the example A. In the illustrated example A, the currently visited place 1506a is determined based on historical place data describing one or more places that the user visited before.

Element 1506b, 1508b, 1510b are graphic crosses representing candidate places close to the vehicle location 1502 in the example B. Element 1506b is a graphic solid cross representing a determined currently visited place for the user in the example B. In the illustrated example B, the place estimation module 205 selects the place 1506b from the candidate places 1506b, 1508b, 1510b as the currently visited place 1506a based on that the place 1506b is within a walkable distance to the vehicle location 1502.

Element 1506c, 1508c, 1510c are graphic crosses representing candidate places close to the vehicle location 1502 in the example C. Element 1506c is a graphic solid cross representing a determined currently visited place for the user in the example C. In the illustrated example C, the place estimation module 205 determines the currently visited place 1506c from the candidate places based on the current time of the day and the time spent at the place. For example, the current time is noon and the time spent at the place is one hour. Then the place estimation module 205 determines that the restaurant 1506c is most likely the place currently visited by the user.

Machine Learnable Data

Figure 16:
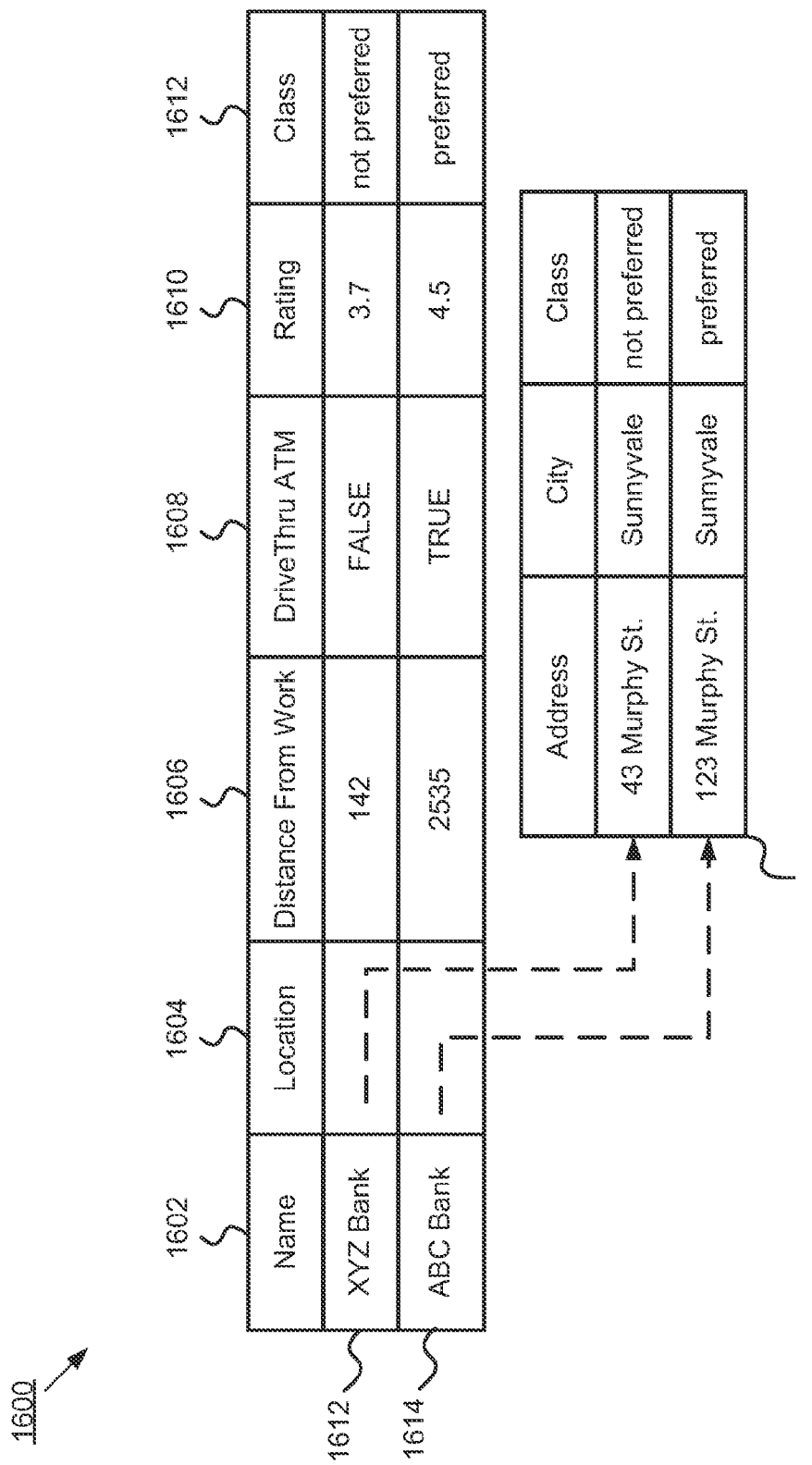
FIG. 16 shows a table illustrating machine learnable data according to one embodiment.

FIG. 16 shows a table 1600 illustrating machine learnable data according to one embodiment. The table 1600 contains training data that one or more of the modeling module 211 and the scoring module 213 use when applying conventional machine learning techniques. All data belonging to a certain type are grouped together in the single table 1600. For example, FIG. 16 shows the table 1600 for banks Row 1612 of the table 1600 includes data for "XYZ bank;" row 1614 of the table 1600 includes data for "ABC Bank." The URI for the data can either be dropped from the training (since row identifier usually does not contribute to the learnt model) or can alternatively be added as a new column in the table such as the table 1600. In one embodiment, the modeling module 211 adds the URI as a new column in the table such as the table 1600 to bias the place affinity model with a higher preference to a previously visited place.

Columns 1602, 1604, 1606, 1608, 1610 in the table 1600 include properties for the banks. For example, column 1602 includes names for the banks Column 1604 includes locations for the banks. In the illustrated embodiment, another table 1650 is linked to the column 1604 describing the locations for the banks, e.g., including addresses, cities, etc. Column 1606 includes distances from work to the banks Column 1608 includes a property of having a drive-through ATM. Column 1610 includes ratings for the banks.

Class Column 1612 includes class values for the banks. For example, the class values include a "preferred" that indicates a user likes or prefers the bank, as well as a "not preferred" that indicates a user does not like or prefer the bank. In one embodiment, if the bank is a place visited by the user before, it is marked as "preferred." In another embodiment, the modeling module 211 determines a place as belonging to the class "not preferred" if it is not selected by the user while performing a POI search.

Evaluation

Figure 17:
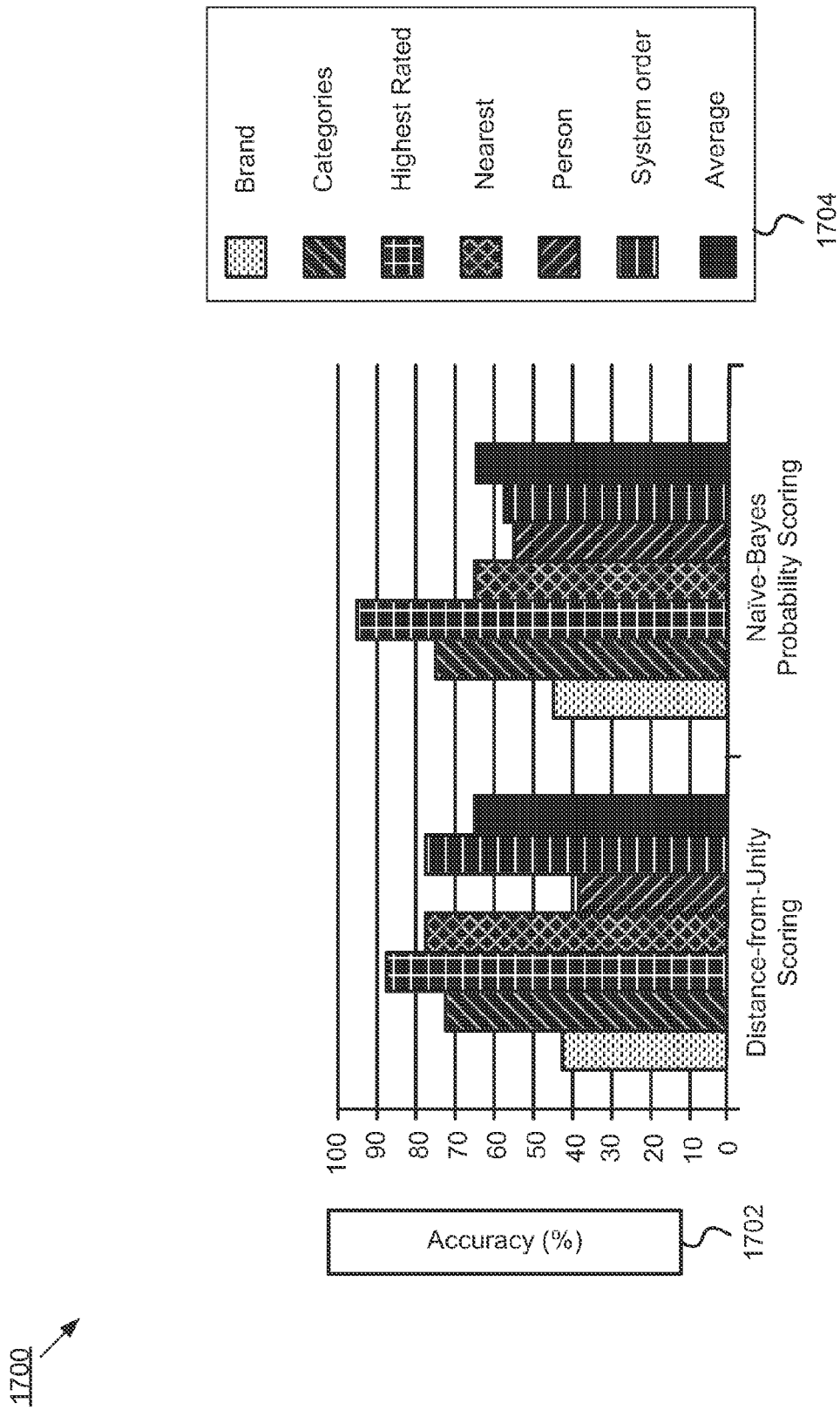
FIG. 17 is a chart illustrating accuracy evaluations for two scoring mechanisms according to one embodiment.

FIG. 17 is a chart 1700 illustrating accuracy evaluations for two scoring mechanisms according to one embodiment. The accuracy evaluations are done based on dummy users such as computer programs that are able to perform selections of POIs based on embedded user profiles. Each dummy user performs a POI search for places belonging to a category (e.g., restaurants, banks, grocery stores, gas stations, etc.) and programmatically selects one or more places based on its profile. In other words, each dummy user is characterized by its profile and always selects a place based on its profile. The accuracy evaluations are based on a set of 25 POI searches, such as "find a restaurant near the airport", "find a coffee shop in Santa Cruz while driving to San Francisco for a break", etc.

The chart 1700 includes a y-axis representing accuracies of the two scoring methods 1702 and a chart legend 1704. The chart legend 1704 describes profiles for the dummy users. For example, a dummy user having a "Brand" profile always selects certain brands such as X Coffee, Toyota, etc. A "Categories" profile indicates that the user always selects places belonging to certain sub-categories (e.g., Japanese restaurant, etc.). A user with a "Highest Rated" profile always selects the highest rated places; a user having a "Nearest" profile always selects the nearest places. A user having a "Person" profile is modeled based on the preferences of a real person after interviewing the real person with a set of questions. A user having a "System order" profile always trusts the system 100 and selects the first item in the place list sorted by the system 100. The chart legend 1704 also include an "Average" item indicating that the "Average" bars in the chart 1700 describe average accuracies over all other bars for the same scoring method.

The chart 1700 includes two groups of bars indicating accuracies for the Distance-from-Unity Scoring method and the Naïve-Bayes Probability Scoring method, respectively. The accuracy represents the percentage of successful searches. For example, a list of matching places for a search is provided and sorted based on either scoring method. If the dummy user selects the first place in the list, then the search is counted as a successful one. In the illustrated chart 1700, each group of bars describes different accuracies for different kinds of dummy users (e.g., users with different profiles) based on either of the two scoring methods.

GUI

Figure 18:
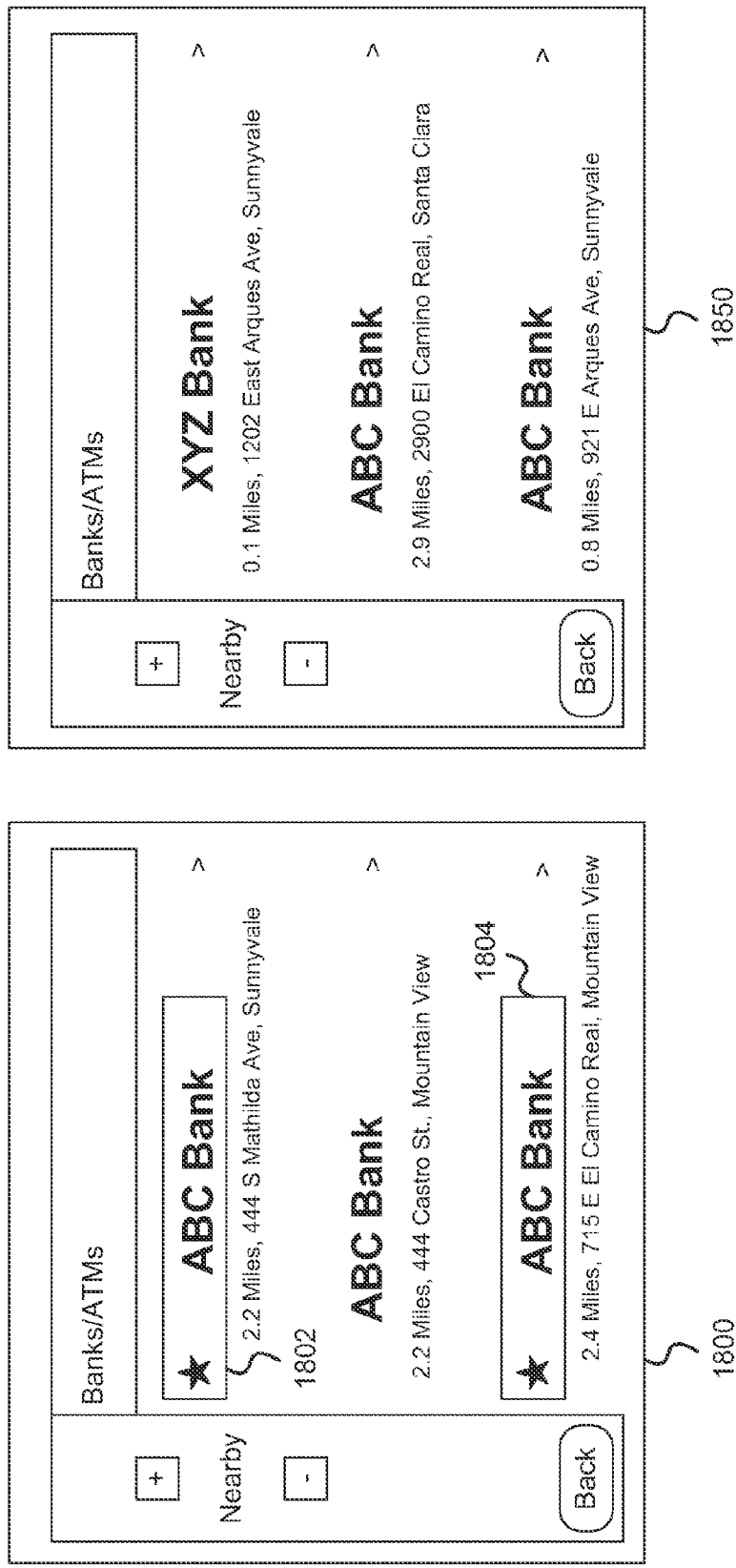
FIG. 18 shows screenshots of place search results for a user according to one embodiment.

FIG. 18 shows screenshots 1800, 1850, of place search results for a user according to one embodiment. The place search results are obtained using the Distance-from-Unity scoring method. The place search result 1800 displays search results for banks in the user's daily commute area. Banks 1802, 1804 are marked with stars to indicate that they have been visited by the user and are used to build the place affinity model (e.g., preference model) for the user.

The place search result 1850 provides the matching banks when the user searches banks in a new area. In the illustrated embodiment, the place search result 1850 shows top three matching banks, among which two banks are preferred by the user. For example, the two preferred banks are both ABC Banks in different locations. The user prefers a specific banking company and the place search result 1850 proves that the underlying place affinity model (e.g., preference model) for the user is able to detect the preference of the user and can be used to personalize the place search result for the user.

In the forgoing description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Furthermore, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, the foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification.

What is claimed is:

1. A computer-implemented method, comprising:
receiving sensor data for a vehicle associated with a user, the sensor data describing a current vehicle location and a current time of day;
retrieving candidate place data describing one or more candidate places within a range of the vehicle location;
retrieving historical place data describing one or more places visited by the user in the past;
estimating a currently visited place for the user based at least in part on the one or more of the sensor data, the candidate place data, and the historical place data;
estimating a first time period spent at the estimated currently visited place;
retrieving a visiting frequency for the estimated currently visited place and a second time period spent on a past visit to the estimated currently visited place; and
determining like data for the estimated currently visited place based on the first time period, the visiting frequency, and the second time period, the like data indicating if the user prefers the estimated currently visited place.

2. The method of claim 1, wherein estimating a currently visited place for the user based at least in part on the one or more of the sensor data, the candidate place data, and the historical place data comprises selecting among the one or more candidate places a place within a walkable distance to the current vehicle location as the currently visited place.

3. The method of claim 1, wherein the currently visited place is one of the one or more candidate places and also one of the one or more places visited by the user in the past.

4. The computer-implemented method of claim 1, wherein estimating the first time period spent at the estimated currently visited place comprises:
determining a first timestamp when the user left the vehicle at the current vehicle location;
determining a second timestamp when the user returned to the vehicle at the current vehicle location; and
computing a time difference between the first timestamp and the second timestamp.

5. A system, comprising:
a communication module for receiving sensor data for a vehicle associated with a user, the sensor data describing a current vehicle location and a current time of day, the communication module retrieving candidate place data describing one or more candidate places within a range of the current vehicle location, the communication module retrieving historical place data describing one or more places visited by the user in the past;
a place estimation module communicatively coupled to the communication module for receiving the sensor data, the candidate place data and the historical place data, the place estimation module estimating a currently visited place for the user based at least in part on the one or more of the sensor data, the candidate place data, and the historical place data;
a sensor communicatively coupled to the communication module, the sensor estimating a first time period spent at the estimated currently visited place; and
a liking module communicatively coupled to the communication module and the sensor, the liking module receiving the first time period spent at the estimated currently visited place and retrieving a visiting frequency for the estimated currently visited place and a second time period spent on a past visit to the estimated currently visited place, the liking module further determining like data for the estimated currently visited place based on the first time period, the visiting frequency, and the second time period, the like data indicating if the user prefers the estimated currently visited place.

6. The system of claim 5, wherein estimating a currently visited place for the user based at least in part on the one or more of the sensor data, the candidate place data, and the historical place data comprises selecting among the one or more candidate places a place within a walkable distance to the current vehicle location as the currently visited place.

7. The system of claim 5, wherein the currently visited place is one of the one or more candidate places and also one of the one or more places visited by the user in the past.

8. The system of claim 5, wherein estimating the first time period spent at the estimated currently visited place comprises:
determining a first timestamp when the user left the vehicle at the current vehicle location;
determining a second timestamp when the user returned to the vehicle at the current vehicle location; and
computing a time difference between the first timestamp and the second timestamp.

9. A computer program product comprising a non-transitory computer readable medium encoding instructions that, in response to execution by a computing device, cause the computing device to perform operations comprising:
receiving sensor data for a vehicle associated with a user, the sensor data describing a current vehicle location and a current time of day;
retrieving candidate place data describing one or more candidate places within a range of the current vehicle location;
retrieving historical place data describing one or more places visited by the user in the past;
estimating a currently visited place for the user based at least in part on the one or more of the sensor data, the candidate place data, and the historical place data;

estimating a first time period spent at the estimated currently visited place;

retrieving a visiting frequency for the estimated currently visited place and a second time period spent on a past visit to the estimated currently visited place; and determining like data for the estimated currently visited place based on the first time period, the visiting frequency, and the second time period, the like data indicating if the user prefers the estimated currently visited place.

10. The computer program product of claim 9, wherein estimating a currently visited place for the user based at least in part on the one or more of the sensor data, the candidate place data, and the historical place data comprises selecting among the one or more candidate places a place within a walkable distance to the current vehicle location as the currently visited place.

11. The computer program product of claim 9, wherein the currently visited place is one of the one or more candidate places and also one of the one or more places visited by the user in the past.

12. The computer program product of claim 9, wherein estimating the first time period spent at the estimated currently visited place comprises:

determining a first timestamp when the user left the vehicle at the current vehicle location;

determining a second timestamp when the user returned to the vehicle at the current vehicle location; and computing a time difference between the first timestamp and the second timestamp.

13. A computer-implemented method, comprising:

receiving a place associated with a user;

retrieving rich place data associated with the place;

retrieving user profile data for the user;

retrieving a previous state of a place affinity model associated with the user, a default standard-user place affinity model pre-computed for one or more groups of users, or an average-user place affinity model generated by aggregating individual place affinity models for a group of users; and generating the place affinity model associated with the user based at least in part on the rich place data and the previous state of the place affinity model, the default standard-user place affinity model, or the average-user place affinity model.

14. The method of claim 13, wherein the place is marked with an affinity value by the user based at least in part on inputs from one or more of an interactive dialog, a survey and retrieved personal data from one or more social networks.

15. The method of claim 13, wherein the rich place data comprises one or more of historical place data for the place, social data describing one or more social connections of the user that have visited the place and web data describing one or more reviews for the place.

16. The method of claim 13, wherein the place affinity model comprises model data describing one or more favorite places for the user and one or more common characteristics for the one or more favorite places.

17. The method of claim 13 further comprising:

receiving sensor data describing a current time of the day and a current vehicle location; and determining a situation for the user based at least in part on the sensor data, wherein the situation for the user and the sensor data are used to estimate the place affinity model.

18. The method of claim 13 further comprising:

receiving a new place;

retrieving new rich place data associated with the new place;

retrieving the place affinity model associated with the user; and updating the place affinity model associated with the user based at least in part on the new rich place data.

19. A system, comprising:

a communication module for receiving a place associated with a user, the communication module retrieving user profile data for the user;

a gathering module communicatively coupled to the communication module for retrieving rich place data associated with the place; and a modeling module communicatively coupled to the gathering module for receiving the rich place data, the modeling module retrieving a previous state of a place affinity model associated with the user and generating the place affinity model associated with the user based at least in part on the rich place data and the previous state of the place affinity model.

20. The system of claim 19, wherein the place is marked with an affinity value by the user based at least in part on inputs from one or more of an interactive dialog, a survey and retrieved personal data from one or more social networks.

21. The system of claim 19, wherein the rich place data comprises one or more of historical place data for the place, social data describing one or more social connections of the user that have visited the place and web data describing one or more reviews for the place.

22. The system of claim 19, wherein the place affinity model comprises model data describing one or more favorite places for the user and one or more common characteristics for the one or more favorite places.

23. The system of claim 19, wherein the communication module receives sensor data describing a current time of the day and a current vehicle location and the modeling module determines a situation for the user based at least in part on the sensor data, wherein the situation for the user and the sensor data are used to estimate the place affinity model.

24. The system of claim 19, wherein the gathering module receives a new place and retrieves new rich place data associated with the new place.

25. The system of claim 24 further comprising a updating module communicatively coupled to the gathering module, the updating module retrieving the place affinity model associated with the user and updating the place affinity model associated with the user based at least in part on the new rich place data.

26. A computer program product comprising a non-transitory computer readable medium encoding instructions that, in response to execution by a computing device, cause the computing device to perform operations comprising:

receiving a place associated with a user;

retrieving rich place data associated with the place;

retrieving user profile data for the user;

retrieving a previous state of a place affinity model associated with the user, a default standard-user place affinity model pre-computed for one or more groups of users, or an average-user place affinity model generated by aggregating individual place affinity models for a group of users; and generating the place affinity model associated with the user based at least in part on the rich place data and the previous state of the place affinity model, the default standard-user place affinity model, or the average-user place affinity model.

27. The computer program product of claim 26, wherein the place is marked with an affinity value by the user based at least in part on inputs from one or more of an interactive dialog, a survey and retrieved personal data from one or more social networks.

28. The computer program product of claim 26, wherein the rich place data comprises one or more of historical place data for the place, social data describing one or more social connections of the user that have visited the place and web data describing one or more reviews for the place.

29. The computer program product of claim 26, wherein the place affinity model comprises model data describing one or more favorite places for the user and one or more common characteristics for the one or more favorite places.

30. The computer program product of claim 26, wherein instructions encoded in the computer readable medium when executed cause the computing device to perform operations further comprising:

receiving sensor data describing a current time of the day and a current vehicle location; and determining a situation for the user based at least in part on the sensor data, wherein the situation for the user and the sensor data are used to estimate the place affinity model.

31. The computer program product of claim 26, wherein instructions encoded in the computer readable medium when executed cause the computing device to perform operations further comprising:

receiving a new place;

retrieving new rich place data associated with the new place;

retrieving the place affinity model associated with the user; and updating the place affinity model associated with the user based at least in part on the new rich place data.

* * * * *